US010611046B2

(12) United States Patent
Blaine

(10) Patent No.: US 10,611,046 B2
(45) Date of Patent: Apr. 7, 2020

(54) ROTATABLE MANIFOLD CUTTER FOR USE IN PORTIONING

(71) Applicant: John Bean Technologies Corporation, Chicago, IL (US)

(72) Inventor: George R. Blaine, Lake Stevens, WA (US)

(73) Assignee: John Bean Technologies Corporation, Chicago, IL (US)

( * ) Notice: Subject to any disclaimer, the term of this patent is extended or adjusted under 35 U.S.C. 154(b) by 189 days.

(21) Appl. No.: 15/487,338

(22) Filed: Apr. 13, 2017

(65) Prior Publication Data

US 2017/0217044 A1    Aug. 3, 2017

Related U.S. Application Data

(63) Continuation of application No. 14/464,928, filed on Aug. 21, 2014, now abandoned.

(Continued)

(51) Int. Cl.
*A22C 17/00* (2006.01)
*B26F 3/00* (2006.01)
(Continued)

(52) U.S. Cl.
CPC .......... *B26F 3/004* (2013.01); *A22C 17/0086* (2013.01); *A22C 21/0023* (2013.01);
(Continued)

(58) Field of Classification Search
CPC . B26F 3/004; A22C 17/0086; A22C 21/0023; B26D 5/007; B26D 5/02; B26D 7/0625
See application file for complete search history.

(56) References Cited

U.S. PATENT DOCUMENTS 2,789,199 A * 4/1957 Bjorksten .............. D01D 5/426
83/171
4,875,254 A * 10/1989 Rudy ................... A22C 17/002
452/157
(Continued)

FOREIGN PATENT DOCUMENTS

CN        1607998 A      4/2005
CN        1703774 A     11/2005
(Continued)

OTHER PUBLICATIONS

Chinese Office Action and Search Report dated Dec. 30, 2016, issued in corresponding Chinese Application No. 201410412483.6, filed Aug. 20, 2014, 28 pages.

(Continued)

*Primary Examiner* — Kenneth E Peterson
*Assistant Examiner* — Liang Dong
(74) *Attorney, Agent, or Firm* — Christensen O'Connor Johnson Kindness PLLC

(57) ABSTRACT

Portioning system 10 includes a scanner 200 for scanning work products 13 being carried on the conveyor 12. A cutter system 17 includes an array or manifold cutter 18 and single cutter 19 for cutting the work products into desired sized end pieces. The cutter assemblies 18 and 19 are carried on respective carriages 16 and 26 to move the cutters as required along predetermined cutting paths as controlled by control system 220.

22 Claims, 17 Drawing Sheets

Related U.S. Application Data

(60) Provisional application No. 61/868,485, filed on Aug. 21, 2013.

(51) Int. Cl.
    *B26D 5/02*     (2006.01)
    *B26D 5/00*     (2006.01)
    *B26D 7/06*     (2006.01)
    *B26F 1/31*     (2006.01)
    *A22C 21/00*     (2006.01)

(52) U.S. Cl.
CPC .............. *B26D 5/007* (2013.01); *B26D 5/02* (2013.01); *B26D 7/0625* (2013.01); *B26F 1/31* (2013.01); *B26D 2210/02* (2013.01); *Y10T 83/0591* (2015.04); *Y10T 83/364* (2015.04)

(56) References Cited

U.S. PATENT DOCUMENTS

| | | |
|---|---|---|
| 4,876,934 A | 10/1989 | Fagan |
| 5,031,496 A | 7/1991 | Lobash |
| 5,243,886 A * | 9/1993 | Rudy .................... B26D 3/18 83/177 |
| 5,365,816 A | 11/1994 | Rudy |
| 5,551,910 A | 9/1996 | Nielsen et al. |
| 5,746,566 A | 5/1998 | Pfarr |
| 5,868,056 A | 2/1999 | Pfarr |
| 6,098,512 A * | 8/2000 | Life .......................... B26D 3/10 83/286 |
| 2002/0067797 A1 | 6/2002 | Safai et al. |
| 2006/0117924 A1 | 6/2006 | Pfarr et al. |
| 2006/0156878 A1 * | 7/2006 | Faires ..................... A22C 7/00 83/13 |
| 2007/0293132 A1 * | 12/2007 | Arnason ............. A22C 25/166 452/140 |
| 2009/0143886 A1 * | 6/2009 | Blaine ................ A22C 17/0086 700/97 |
| 2013/0340580 A1 | 12/2013 | Strong |

FOREIGN PATENT DOCUMENTS

| | | |
|---|---|---|
| DK | 200800036 A | 1/2009 |
| EP | 0 307 174 A1 | 3/1989 |
| EP | 0 739 693 A2 | 10/1996 |
| EP | 0 955 138 A2 | 11/1999 |
| EP | 2 236 040 A1 | 10/2010 |
| GB | 2421676 B | 3/2010 |
| WO | 89/08983 A1 | 10/1989 |
| WO | 99/54099 A1 | 10/1999 |
| WO | 03/055654 A1 | 7/2003 |
| WO | 2004/025724 A1 | 3/2004 |

OTHER PUBLICATIONS

Office Action, Search Report, and Search Opinion, dated Mar. 6, 2015, issued in related Icelandic Patent Application No. 9052, filed Aug. 15, 2014, 6 pages.

* cited by examiner

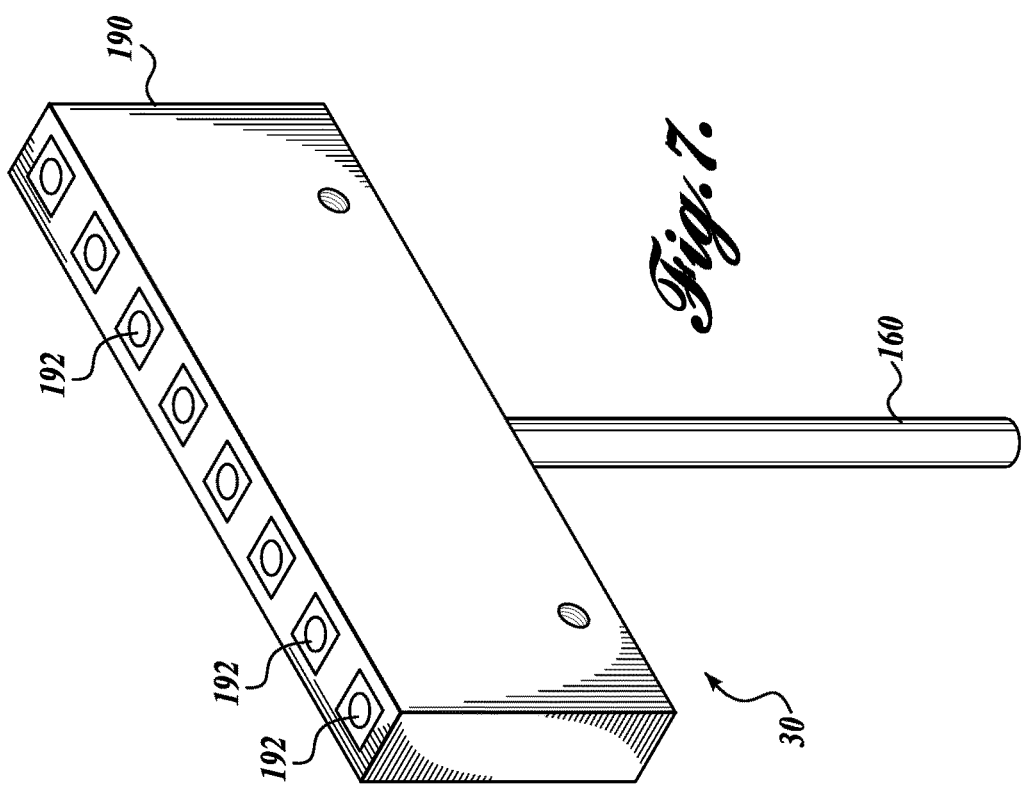
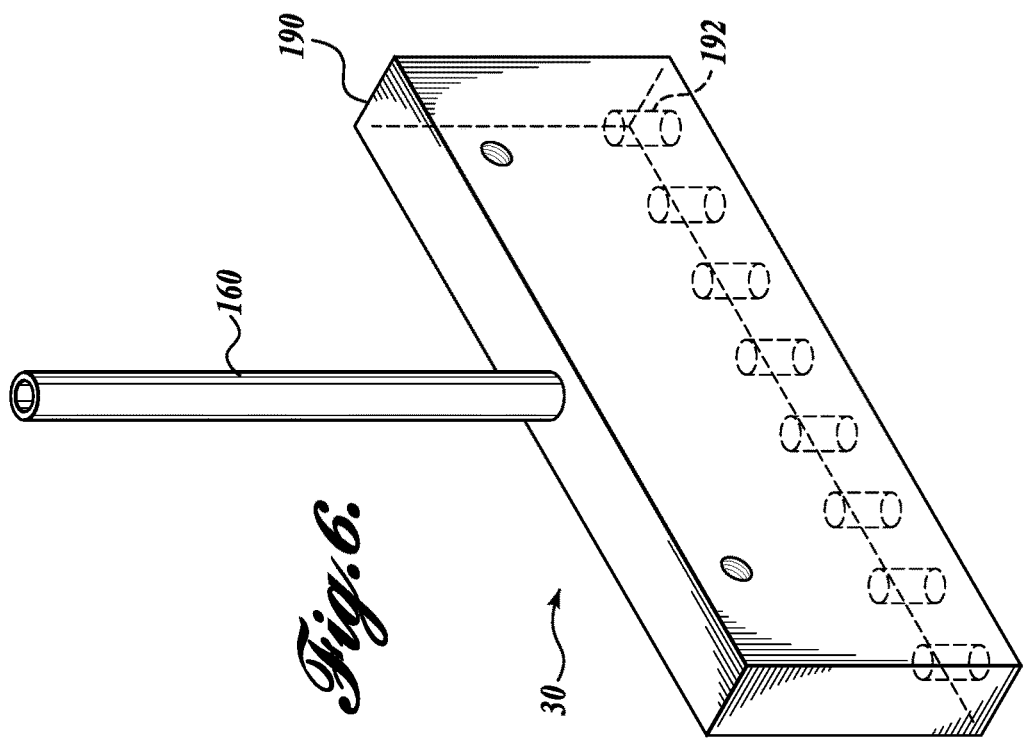

KEEL ONLY

STRIPS

STRIPS FROM CHICKEN BREAST BUTTERFLY

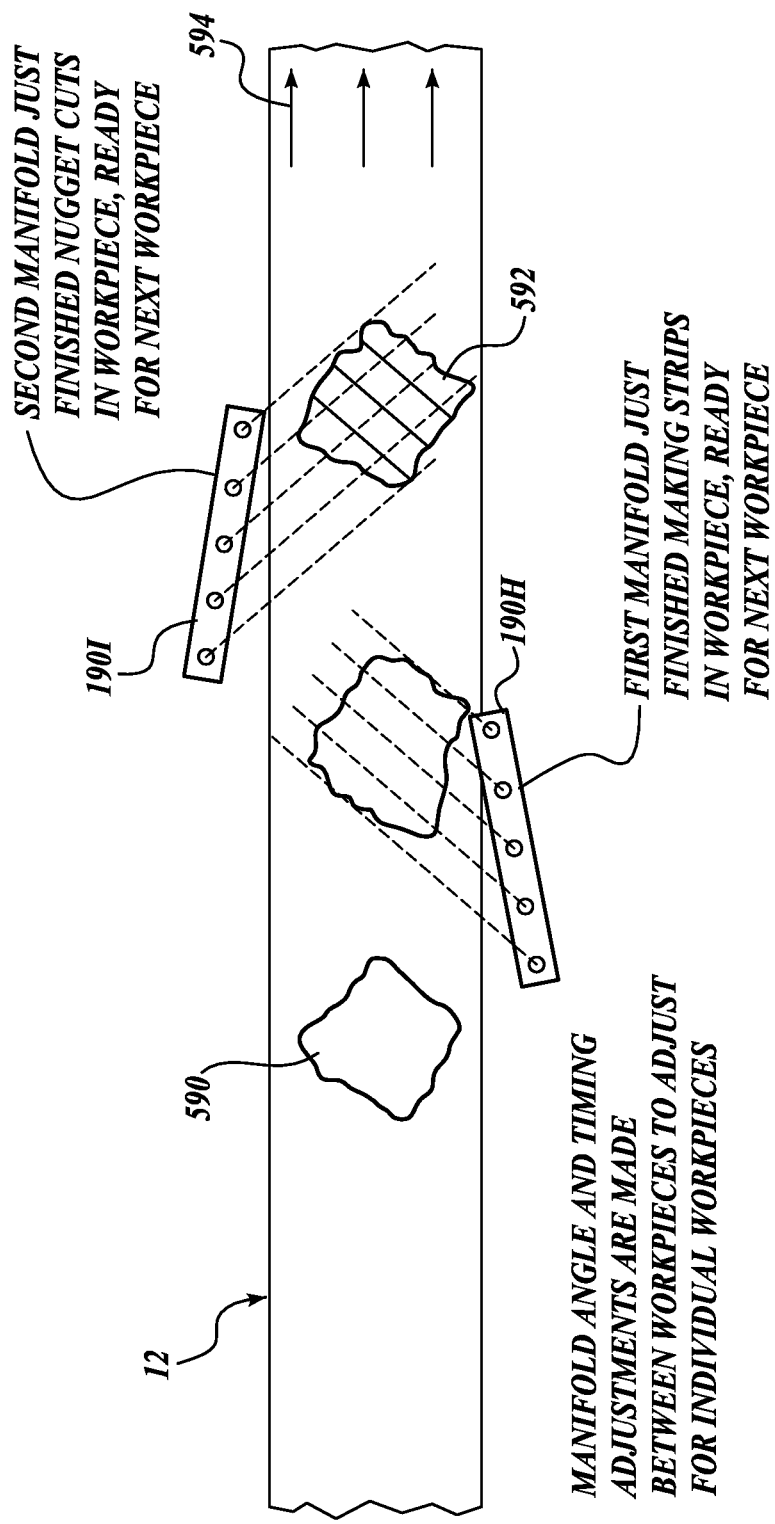

ROTATABLE MANIFOLD CUTTER FOR USE IN PORTIONING

CROSS-REFERENCE TO RELATED APPLICATION

This application is a continuation of U.S. patent application Ser. No. 14/464,928, filed Aug. 21, 2014, which claims the benefit of Provisional Patent Application No. 61/868,465, filed Aug. 21, 2013, both of which disclosures are expressly incorporated herein by reference.

BACKGROUND

High speed water jets are commonly used to cut or portion foods and other objects that are being transported by an underlying conveyor belt. The high speed, high-pressure water jets are emitted from nozzles that are mounted on carriages that ride along tracks disposed transversely to the moving conveyor. By timing the transverse movement of the carriages, it is possible to make cuts in a workpiece that are diagonal to the direction of the movement of the conveyor, and it is also possible to make curved cuts in the workpiece.

Moreover, cutter apparatus have been developed to also allow the nozzle to move longitudinally along the conveyor belt. This has increased the ability to carry out more complicated cutting patterns, while maintaining high precision. However, the use of individual nozzles has required the development of fairly complicated portioning machines when it is desired to utilize a number of nozzles, for example to achieve relatively small portions cut from a workpiece, or to increase the throughput of a conveyor line.

The present disclosure seeks to address the shortcomings of existing water jet cutting systems.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

A portioning system for portioning work products positioned along a moving conveyor belt, includes a first cutter assembly for portioning the work products. The first cutter assembly includes a first carriage, a first gantry disposed transversely to the direction of travel of the conveyor belt for supporting and guiding the first carriage for movement along the first gantry and thereby transversely to the conveyor belt. The first cutter assembly also includes a first drive system for moving the first carriage along the first gantry. A cutter manifold is carried by the first carriage for emitting a plurality of cutting beams to be directed at the work products while being carried on the conveyor belt. A rotational drive is provided to rotate the cutter manifold about an axis.

In accordance with a further aspect of the present disclosure, the first drive system includes a first motive system for the first carriage. The first motive system is positioned at a location remote from the first carriage and also remote from the first gantry. The first drive system also includes a first drive train for connecting the first carriage with the remotely located first motive system.

In accordance with a further aspect of the present disclosure the first motive system is also located remotely from the cutter manifold. In addition, the first drive train interconnects the first motive system with the cutter manifold. In this regard, the drive train transmits motive force from the remotely located first motive system to rotate the cutter manifold about an axis.

In accordance with a further aspect of the present disclosure, the first drive train includes a drive belt extending between the cutter manifold and the remotely located first motive system.

In accordance with a further aspect of the present disclosure, the mounting structure is provided for mounting the cutter manifold to the first carriage.

In accordance with a further aspect of the present disclosure, the cutter manifold includes a plurality of outlets to emit the cutter beams from such outlets. Further, the outlets are controllable between on and off conditions.

In accordance with a further aspect of the present disclosure, a second cutter assembly is provided. Such second cutter assembly includes a second carriage, second gantry for supporting and guiding the second carriage for movement along the gantry, a second drive system for moving the second carriage along the second gantry, and a line cutter carried by the second carriage.

In accordance with a further aspect of the present disclosure, a third carriage support structure is supported and carried by the second carriage. Correspondingly, a third carriage is adapted to ride along the third carriage support structure, with a line cutter carried by the third carriage.

In accordance with a further aspect of the present disclosure, a portioning apparatus is provided for portioning food products. The portioning apparatus includes a cutter for emitting an array of cutting beams for portioning the food products. In addition, a drive system is provided for simultaneously translating and optionally rotating the cutter to alter the cutting paths of the cutting beams.

In a further aspect of the present disclosure, a method for cutting a workpiece is provided, wherein the workpiece is moved along the travel path and an array cutter for emitting and plurality of cutter beams in a controlled manner is moved along a translational path and optionally simultaneously about a rotational axis, relative to the travel path of the workpiece.

In accordance with a further aspect of the present disclosure, the movement of the array cutter is controlled to cut the workpiece into one or more strips along a desired cutting path.

In accordance with a further aspect of the present disclosure, the movement of the array cutter is controlled, thereby controlling the overall width of the cutting path created by the plurality of cutter beams by rotation of the array cutter about a rotational axis.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIG. 6 is an enlarged isometric view of the cutter manifold utilized in the cutter assembly of FIG. 2;

FIG. 7 is a view of the cutter manifold from beneath the cutter manifold;

FIG. 18 schematically illustrates how manifold-type cutter assemblies may be utilized to dice workpieces into square or diamond-shaped nuggets, and simultaneously adjust for the size of the workpiece.

DETAILED DESCRIPTION

Overall System

Figure 1:
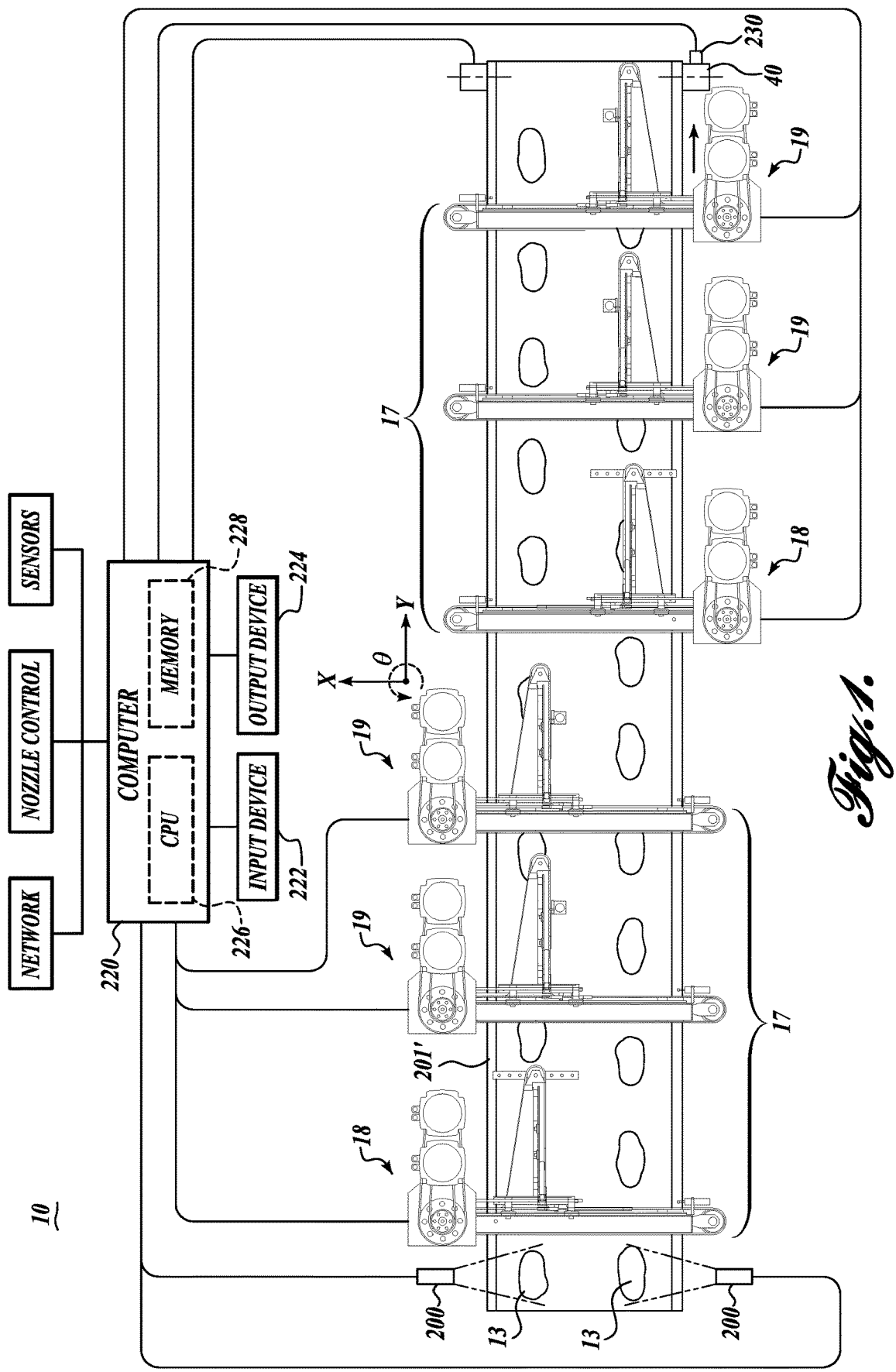
FIG. 1 schematically illustrates a portioning system according to one embodiment of the present disclosure.

FIG. 1 schematically illustrates a system 10 suitable for implementing an embodiment of the present disclosure. The system 10 includes a moving support surface in the form of a conveyor 12 for carrying work products 13 arranged in multiple lanes or windrows extending along the conveyor, to be portioned. The work products may be a food product, such as meat, poultry, or fish that are spaced along the conveyor. Other types of work products may include items composed of, for example, fabric, rubber, cardboard, plastic, wood, or other types of material spaced along the conveyor.

In a scanning aspect, the system 10 includes a scanner 200 for scanning the work products 13. In a cutting or dicing aspect, system 10 may include a cutter system 17 composed of cutter assemblies 18 and 19 (or an array or series of such cutter assemblies) for cutting or portioning the work products into end pieces of desired sizes or other physical parameters. The conveyor 12 and the scanner 200 are coupled to, and controlled by, processor or computer 220. As illustrated, the processor/computer includes an input device 222 (keyboard, mouse, etc.) and an output device 224 (monitor, printer, etc.). The computer 220 also includes CPU 226 and a memory 228.

Generally, the scanner 200 scans the work products 13 to produce scanning information representative of the work products and forwards the scanning information to the processor/computer 220. The processor/computer, using a scanning program, analyzes the scanning data to develop a width, area, and/or volume distribution of the scanned work product. The processor/computer may also develop a thickness profile of the scanned work product. The processor/computer 220 then can model the work product to determine how the work product might be divided and cut into end products composed of specific physical criteria, including, for example, shape, weight, and/or thickness. In this regard, the processor/computer takes into consideration that the thickness of the work product may be altered, either before or after the work product is cut by the cutter assemblies or apparatus 18 and 19 by a cutter or slicer, not shown. The processor/computer, using the scanning program or the portioning program, determines how the work product may be portioned into one or more end product sets. The processor/computer 220, using the portioning software, then functions as a controller to control the cutter assemblies 18 and 19 to portion the work product according to the selected end products.

Describing the foregoing system's method in more detail, the conveyor 12 carries the work products 13 beneath the scanning system 200. The scanning system may be of a variety of different types, including a video camera (not shown) to view the work products 13 illuminated by one or more light sources. Light from the light source is extended across the moving conveyor belt 36 to define a sharp shadow or light stripe line, with the area forwardly of the transverse beam being dark. When no work product 13 is being carried by the infeed conveyor 12, the shadow line/light stripe forms a straight line across the conveyor belt. However, when the work products 13 pass across the shadow line/light stripe, the upper, irregular surface of the work product produces an irregular shadow line/light stripe as viewed by a video camera angled downwardly on the work product and the shadow line/light stripe. The video camera detects the displacement of the shadow line/light stripe from the position it would occupy if no work product were present on the conveyor belt. This displacement represents the thickness of the work product along the shadow line/light stripe. The length of the work product is determined by the distance of the belt travel that shadow line/light stripes are created by the work product. In this regard, an encoder 230 is integrated into the infeed conveyor 12, with the encoder generating pulses at fixed distance intervals corresponding to the forward movement of the conveyor.

In lieu of a video camera, the scanning station may instead utilize an x-ray apparatus (not shown) for determining the physical characteristics of the work product, including its shape, mass, and weight. X-rays may be passed through the object in the direction of an x-ray detector (not shown). Such x-rays are attenuated by the work product in proportion to the mass thereof. The x-ray detector is capable of measuring the intensity of the x-rays received thereby, after passing through the work product. This information is utilized to determine the overall shape and size of the work product 13, as well as the mass thereof. An example of such an x-ray scanning device is disclosed in U.S. Pat. No. 5,585,603, incorporated by reference herein. The foregoing scanning systems are known in the art and, thus, are not novel per se. However, the use of these scanning systems, in conjunction with the other aspects of the described embodiments, is believed to be new.

The data and information measured/gathered by the scanning device(s) are transmitted to the processor/computer 220, which records the location of the work products 13 on the conveyor 12, as well as the lengths, widths, and thicknesses of the work products about the entire work products. With this information, the processor, operating under the scanning system software, can develop an area profile as well as a volume profile of the work products. Knowing the density of the work products, the processor can also determine the weight of the work products or segments or sections thereof.

Although the foregoing description discusses scanning by use of a video camera and light source, as well as by use of x-rays, other three-dimensional scanning techniques may be utilized. For example, such additional techniques may be by ultrasound or moiré fringe methods. In addition, electromagnetic imaging techniques may be employed. Thus, the present invention is not limited to the use of video or x-ray methods, but encompasses other three-dimensional scanning technologies.

Various types of cutter assemblies/apparatus 18 and 19 may be utilized to cut the work products 13 into smaller end portions. Examples of cutting assemblies include high-speed waterjets or lasers. Examples of a high-speed waterjet cutting system are disclosed by Rudy, U.S. Pat. No. 5,365,816, and Pfarr et al., U.S. Pat. No. 5,868,056, incorporated by reference herein. The processor 220, operating under the portioning software, can control the cutting paths of the cutter assemblies 18 and 19 to automatically portion the work product into a set of smaller end product portions. In this regard, the cutter assemblies 18 and 19 present a cutting line that may be vertical or otherwise transverse to the support surface of the conveyor. Of course, the cutting line can also be tilted or canted to present a cutting line that is other than vertical or transverse to the support surface of the conveyor.

Cutter Systems

Cutter systems 17 are illustrated as mounted to a conveyor 12 (moving support surface) for supporting and moving work products 13. The cutter system 17 includes at least one manifold or array-type cutter apparatus 18 and at least one single cutter apparatus 19. FIGS. 1-9 depict cutter apparatus 18 and 19, and generally correspond to U.S. Pat. No. 5,868,056. The manifold with apparatus is capable of emitting an array of cutting beams or lines in the form of high pressure water jets, laser beams, or other high energy beams. Likewise, the cutter apparatus 19 emits a single cutting beam.

The cutter apparatus/assembly 18, in basic form includes a support structure 14 extending across the conveyor 12 for supporting and guiding a carriage 16 for movement transversely to the direction of movement of the conveyor. The carriage 16 is powered by a drive system including in part a motive system 20 and a drive train 22. A second, longitudinal support structure or beam 24 is cantilevered outwardly from carriage 16 in a direction generally aligned with the direction of movement of the conveyor 12. A manifold cutter 30 is rotatably mounted at the end of support beam 24 to operate on the underlying work products 13 being carried by the conveyor 12. The manifold cutter 30 is rotated by a second motive system 28 that forms part of the drive train 22. The rotation of the manifold cutter enables the effect width separating the cutting lines or beams to be narrowed or widened to achieve a desired distance between the cutting lines/beams and/or to adjust to the workpiece being cut or positioned, as described more fully below.

As will be appreciated in the following more detailed description, the cutter apparatus 18 of the manifold cutter 30 of the present disclosure is designed with a minimum of moving mass so that the manifold cutter 30 can be moved as quickly as possible relative to the work products, enabling the manifold cutter to carry out precise operations on the work products at high speed. This is achieved at least in part by locating the motive system 20 at a stationary location remote from the carriage 16 and manifold cutter 30. Also, a lightweight but highly durable drive train 22 is utilized to interconnect the carriage 16 and manifold cutter 30 to motive system 20.

Referring specifically to FIGS. 2-5, the conveyor 12 includes a moving belt 36 that slides over a support bed 38. The bed 38 is supported by underlying rollers carried by a frame structure (not shown) in a standard manner. The conveyor belt 36 is driven at a selected speed by a drive motor 40 in a standard manner. The drive motor 40 can be composed of a variable speed motor to thus adjust the speed of the belt 36. The work products 13 are carried on the conveyor belt 36 to be operated on by the manifold cutter 30.

Figure 2:
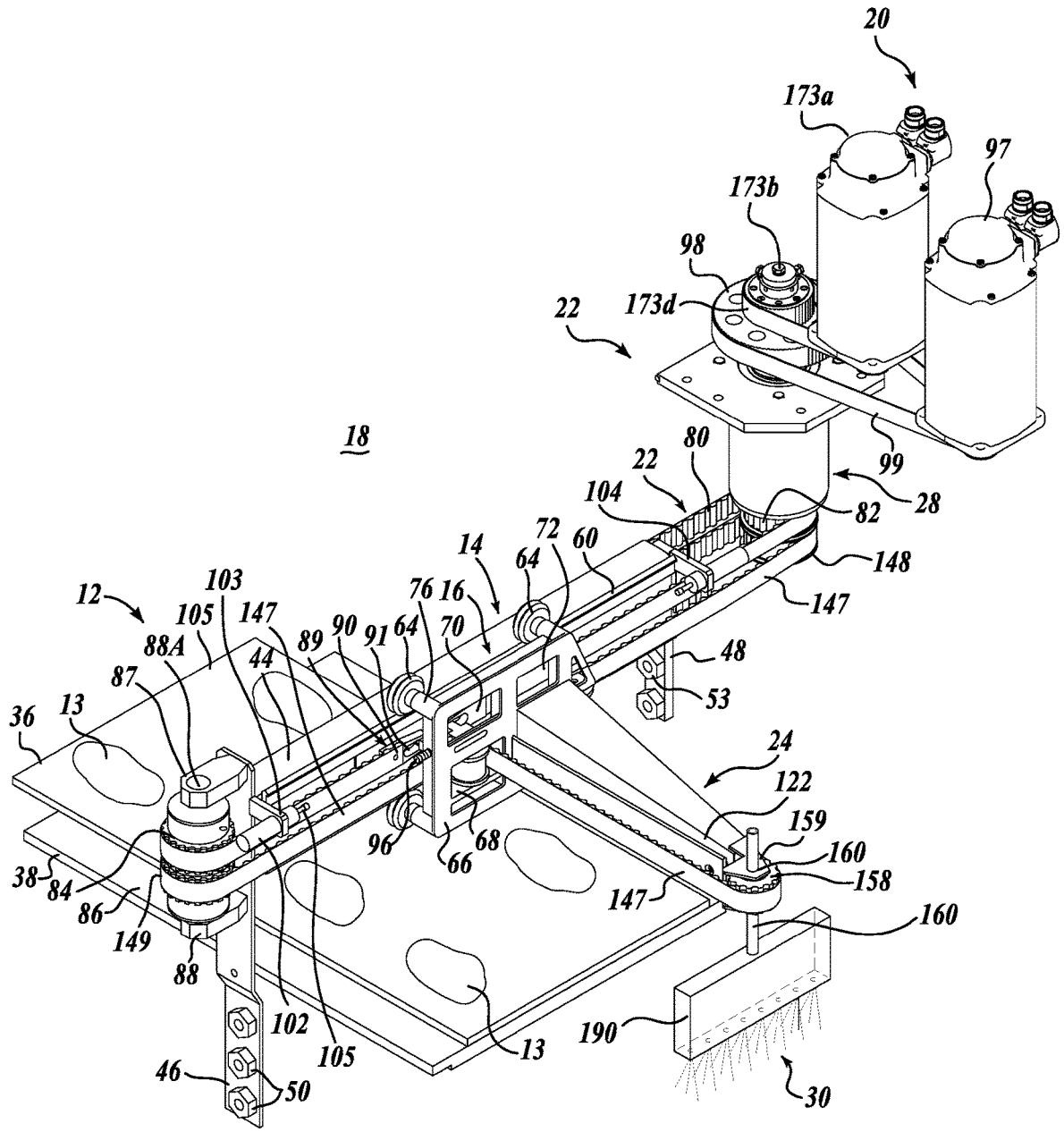
FIG. 2 is an isometric view of a manifold-type cutter assembly, which can be utilized in the portioning system of FIG. 1.

The transverse support structure 14 is composed of a gantry 44 that spans transversely across the conveyor 12 at an elevation spaced above belt 36. Ideally, the gantry 44 is composed of a hollow, rectangular construction, but may be formed in other manners and shapes without departing from the spirit or scope of the present invention. The ends of gantry 44 are supported by elongated upright brackets 46 and 48. As shown in FIG. 2, bracket 46 is fixed to the adjacent end of the gantry 44 to extend downwardly for mounting to conveyor 12. A plurality of hardware members 50 extend through clearance holes (not shown) formed in the lower, offset portion of bracket 46 to attach the bracket to the conveyor. Bracket 48 extends downwardly from the opposite end of gantry 44 for attachment to the conveyor 12. In this regard, hardware members 53 extend through clearance holes provided in the lower end of bracket 48 to attach the bracket to the conveyor. In this manner, the gantry 44 is mounted securely and stationarily on the conveyor.

Figure 4:
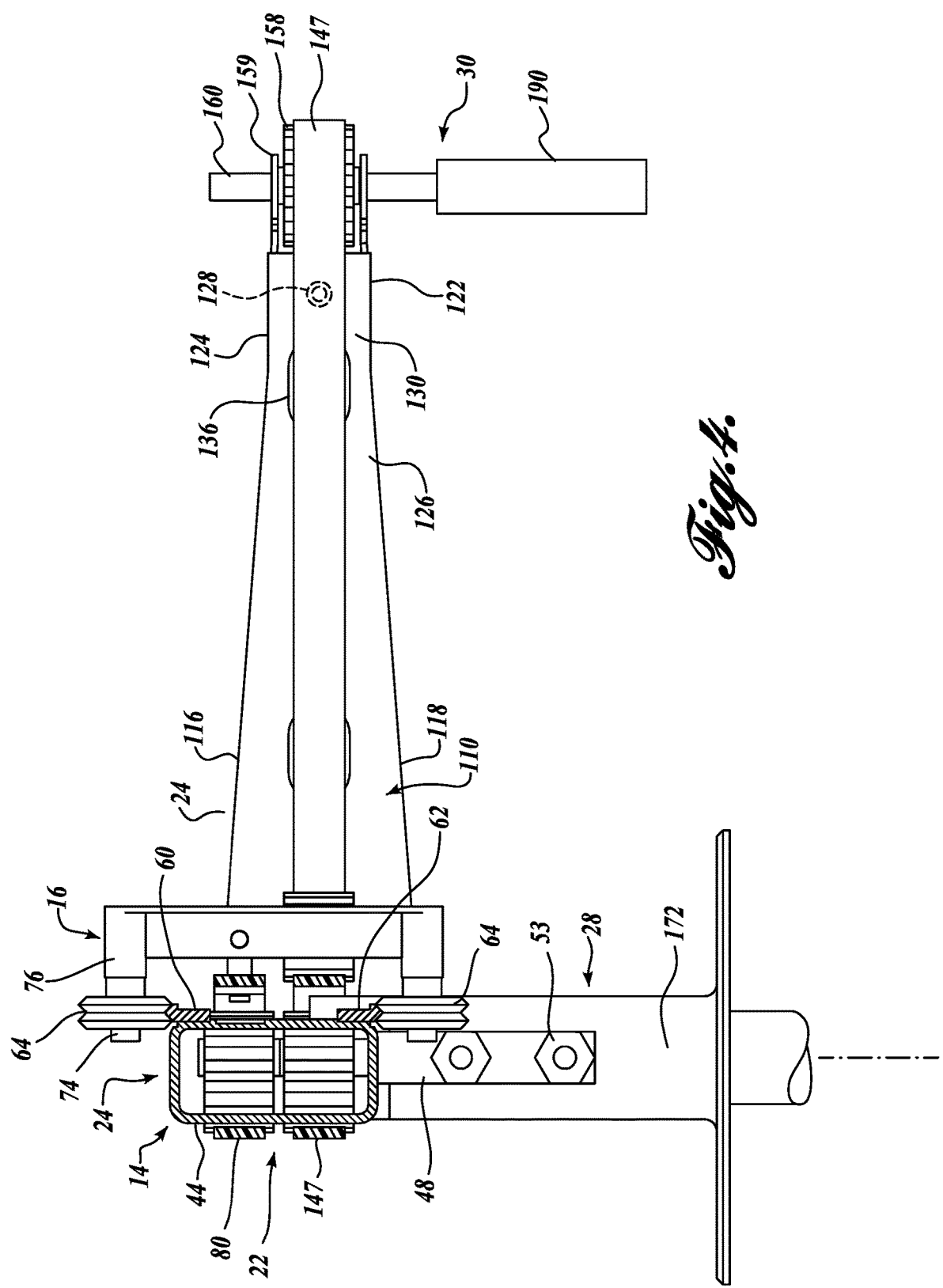
FIG. 4 is a side elevation view of a portion of FIG. 2.

Support structure 14 also includes a track for guiding carriage 16 along gantry 44, composed of an upper rail 60 and the lower rail 62 attached to the face of gantry 44 facing the carriage. As illustrated in FIG. 4, the upper rail 60 extends along the upper corner of gantry 44 whereas the lower rail 62 extends along the lower corner of the beam. As also illustrated, the upper surface of the upper track 60 and the lower surface of the lower track 62 are crowned to engage with the concave outer perimeters of rollers 64 of carriage 16. As such, the carriage 16 is held captive on the track while traveling back and forth along gantry 44.

Figure 3:
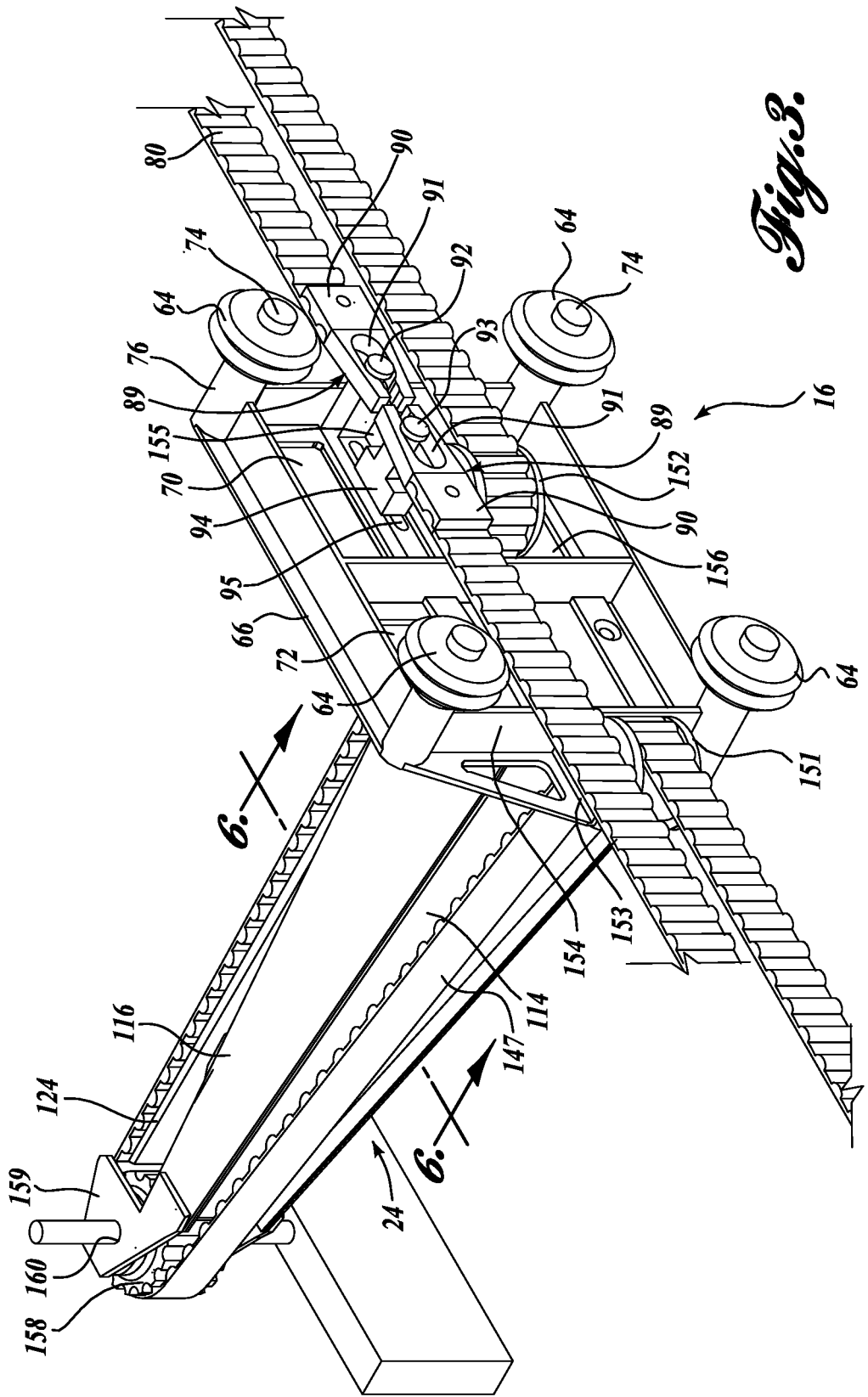
FIG. 3 is an isometric view taken from the opposite side of FIG. 2.

As most clearly illustrated in FIGS. 2-4, carriage 16 includes a substantially planar, generally rectangularly shaped bed portion 66 having a reinforced outer perimeter for enhanced structure integrity. Openings 68, 70, and 72 are formed in bed 66 to reduce its weight while retaining the structural integrity of the bed. The carriage rollers 64 are attached to the corners of the bed 66 by stub axles 74 which engage within through-bores formed in bosses 76 which extend transversely from each of the four corners of the carriage bed 66. Antifriction bearings (not shown) are utilized between the rollers 64 and the stub axles 74 to enhance the free rolling of carriage 16 along gantry 44.

Carriage 16 is powered to move back and forth along gantry 44 by motive system 20. In this regard, a timing belt 80 extends around a driven pulley 82 located at the lower end of drive shaft assembly 173b of motive system 20 and also around an idler pulley 84 of an idler assembly 86 mounted on the upper end of bracket 46 by upper and lower bracket ears 87 and 88. As such, the belt 80 makes a loop around the gantry 44, extending closely along the sidewalls of the beam. The idler pulley 84 is adapted to rotate freely about central shaft 88A of the idler assembly 86 through the use of an antifriction bearing (not shown) with the upper and lower ends of the shaft being retained by bracket ears 87 and 88.

The ends of belt 80 are connected to the backside of carriage bed 66. As most clearly shown in FIGS. 2 and 3, clips 89 are clamped to the ends of belt 80 for use in attaching the ends of the belt to the carriage 16 in a quick release manner. Each of the clips 89 includes a clamping face 90 for attachment to an end of the belt 80. The clips 89 also include an elongated slot portion 91 for engagement over a pin 92 anchored to carriage 16 and anchor pin 93 extending transversely from a slide block 94 keyed within a longitudinal, horizontal slot 95 extending along a carriage bed 66. A threaded pin 96 extends outwardly of a slide block 94 in a direction substantially perpendicular to pin 93 to engage within a threaded hole formed in the perimeter of carriage bed 66 to extend outwardly of the carriage bed. The tension of belt 80 is adjusted by rotation of pin 96.

As shown in FIG. 3, the ends of clips 89 are not closed, but rather the slot portion 91 is open, with the opening being of a width somewhat narrower than the diameter of anchor pins 92 and 93. It will be appreciated that if carriage 16 is ever in a "runaway" condition or if motive system 20 malfunctions tending to cause the carriage to overrun gantry 44, the belt 80 can detach from the carriage 16 by separation of either or both ends of clip 89 to cause the clip(s) to longitudinally slide off of the anchor pin 92/93. As such, potential damage to cutter apparatus 18 may be avoided or at least minimized.

Referring to FIG. 2, the motive system 20 includes a servo motor 97 programmable to control the movement of the carriage 16 back and forth along gantry 44 as desired. The servo motor is located at a location substantially insulated from moisture or other contaminants that may be associated with the work being carried out on the work products. A hollow drive shaft (not shown) extends up through drive shaft assembly 173B. The driven pulley 82 is attached to the lower end of the hollow drive shaft and a drive pulley 98 is attached to the upper end of the hollow drive shaft. The drive pulley 98 is connected by belt 94 to an output drive pulley (not visible) powered by motor 97. It will be appreciated that by the foregoing construction, the servo motor 97 is located remotely from the carriage 16, with the driving force applied to the carriage 16 by the lightweight timing belt 80.

Although ideally motive system 20 utilizes a servo motor, other types of electrical, hydraulic, or air motors may be employed without departing from the spirit or scope of the present invention. Such motors are standard articles of commerce.

By the foregoing construction, motive system 20 is capable of quickly accelerating and decelerating carriage 16 for movement along gantry 44. To assist in the deceleration of the carriage 16, shock absorbers 102 are mounted at each end of gantry 44 by brackets 103 and 104 extending outwardly from the beam. Ideally, but not essentially, the brackets 103 and 104 may be integrally constructed with brackets 46 and 48, respectively. The shock absorbers 102 include a plunger 105 directed at the end edges of carriage bed 66. Although not shown, a piston is attached to the plunger 105 within the interior of the shock absorber cylinder which is filled with a fluid to resist the retraction of the plunger 105 in a manner similar to a "standard" hydraulic shock absorber. Also, the shock absorber 102 includes an interior compression spring (not shown) that nominally extends the plunger 105 longitudinally outwardly from the shock absorber cylinder. As such, if the carriage bed 66 strikes against one of the plungers 105, the plunger retracts somewhat when bringing the carriage 16 to a stop.

Next, referring specifically to FIGS. 2, 3, 4, and 5, the longitudinal support structure or beam 24 cantilevers transversely from carriage 16 to be carried by the carriage. The beam 24 is composed of a vertical sidewall 112, which is substantially perpendicular to the adjacent face of carriage bed 66. The opposite sidewall 114, rather than being substantially perpendicular to the carriage bed 66, tapers towards sidewall 112 in the direction away from the carriage bed. Likewise, the top and bottom walls 116 and 118 of beam 24 taper towards the free end of the beam 24, thereby to cooperatively form a generally peaked or pyramid shape. As will be appreciated, this enhances the structural integrity of the beam while reducing its weight relative to a parallelpiped structure.

Figure 5:
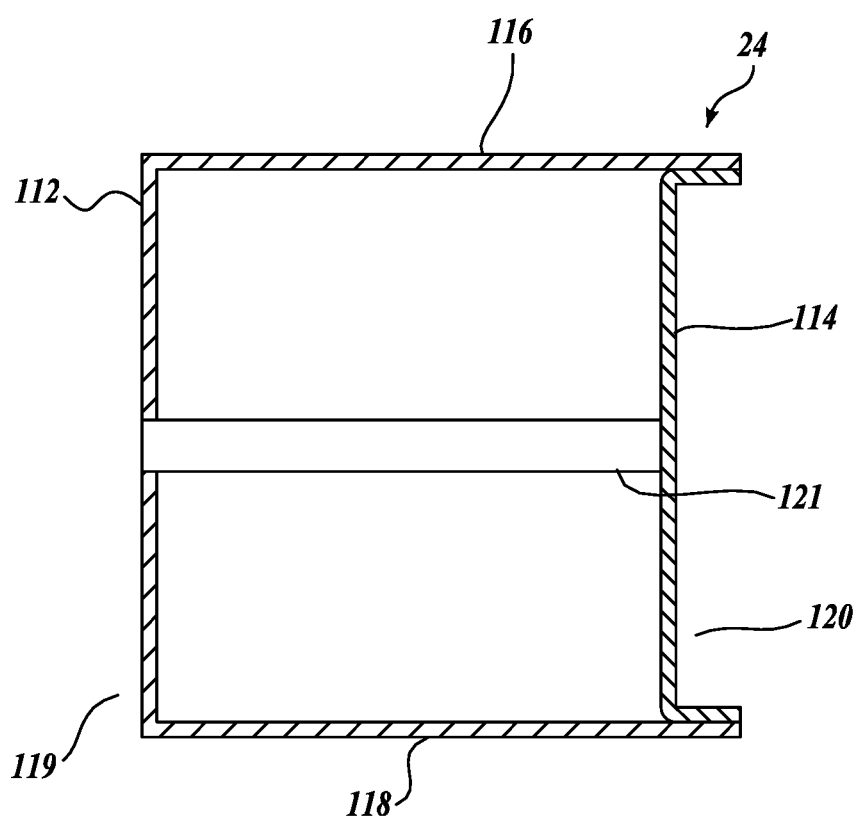
FIG. 5 is a cross-sectional view of the support beam shown in FIG. 3.

As illustrated in FIG. 5, ideally the beam 24 is of hollow construction, composed of two channel-shaped members 119 and 120. Channel member 120 nests within channel-shaped member 119 so that the flanges of channel member 120 overlap the free end edges of the flanges of channel-shaped member 119, as shown in FIG. 5. A plurality of spacers 121 are disposed within the beam member 24 and located along its length to bear against the sidewalls 112 and 114 of the channel members 119 and 120. The flanges of the two channel members are attached together and the spacers 121 are attached to the channel members by any convenient means, including by weldments. It will be appreciated that by the foregoing construction, beam 24 is not only lightweight, but also of sufficient structural integrity to carry significant weight without deflection. Lastly, beam 24 may be secured to the carriage bed 66 by any appropriate technique, including by hardware fasteners, weldments, etc.

A pulley 158 is mounted on the free end of beam 24 by a formed bracket 159 which is fixedly attached to the beam 24. A fluid inlet shaft 160 extends through the center of the pulley 158 and is retained by the pulley, and the pulley 158 is mounted on the upper and lower ears of bracket 159. Anti-friction bearings, not shown, are interposed between the pulley 158 and the brackets 159.

As can be appreciated, rotation of the pulley 158 results in rotation of the inlet shaft 160 and thus the cutter outlet manifold 30. A timing belt 147 is powered to rotate the pulley 158. The timing belt 147 is trained around a driven pulley 148 of motive system 20. The portion of drive train 22 connecting the timing belt 147 to motive system 20 is described more fully below with respect to FIGS. 9 and 10, and also trained around an idler pulley 149 located below idler pulley 84 on the idler assembly 86 which is secured to the end of gantry 44 opposite the motive system 28. As such, the belt 147 also extends along the opposite sidewalls of gantry 44, but at an elevation spaced below belt 80.

The belt 147 also trains around idler pulleys 151 and 152 mounted on transverse carriage 16. As illustrated in FIG. 3, the idler pulley 151 is mounted to an upper bracket plate 153 and a lower similar bracket plate (not shown), extending transversely outwardly from the end perimeter wall 154 of the carriage. A vertical shaft extends between these two bracket plates and through the longitudinal center of the idler pulley 151. Idler pulley 152 is mounted between a pair of parallel, spaced-apart frame plates 155 and 156. As with idler pulley 151, idler pulley 152 rotates about a vertical shaft extending between the two frame plates. The idler pulleys 151 and 152 redirect the belt 147 to extend along the sides of transverse beam 24. Antifriction bearings (not shown) are employed to enable the idler pulleys 151 and 152 to freely rotate about their respective vertical shafts.

Also, as with the transverse carriage 16, it will be appreciated that motive system 20 is located remotely from the rotatable manifold cutter 30. As a result, the mass of the motive system 20 is not carried by carriage 16; rather, the motive system is positioned at a stationary location, with the drive force being transferred from motive system 20 to pulley 158 by a lightweight timing belt 147. As a consequence, the total mass of the moving portions of cutter apparatus/assembly 19, including support beam 24 and pulley 158, is kept to a minimum. This allows extremely high-speed rotational movement of the manifold cutter 30.

Referring primarily to FIGS. 2, 6, and 7, the cutter assembly 18 includes manifold 190 in fluid flow communication with fluid inlet shaft 160. The upper end of the fluid inlet shaft is connectable to a source of very high pressure fluid, such as water, or water with specific additives. The high-pressure fluid enters the manifold 190 via inlet shaft 160, and then the high pressure fluid is routed to a plurality of outlet nozzles 192 disposed along the lower edge of the manifold 190. Although the nozzles 192 are shown as fairly uniformly spaced apart along the lower edge portion of the manifold, other spacings of the nozzles 192 are possible, including arranging two or more nozzles into a specific group or cluster. In one non-limiting example, the nozzles can be uniformly spaced from approximately 0.5 to 2 inches apart. Also, the number of nozzles 192 utilized may range from as few as two to at least 15 or more, depending in part on what type of cut(s) is being made, the size of the workpieces, the spacing between the cuts, etc.

The manifold 190 can take various forms other than as illustrated in FIGS. 6 and 7, especially to reduce the mass of the manifold 194 and thus the rotational inertia of the manifold, thereby causing the manifold to be more easily and more quickly rotated, stopped, and then rotated again in the same or different direction. For example, the manifold, rather than being constructed from a solid rectangular structure, can be composed in part of hoses or lines leading from the lower end of inlet shaft to an associated nozzle 192.

Although the exterior of the inlet shaft 160 is shown to be round in shape, they can be of other shapes so as to match the interior shape of the pulley 158, and thereby creating a secure engagement between the inlet shaft 160 and the pulley 158, especially during rotation of the manifold 190.

The nozzles 192 can take numerous forms. For examples, the nozzles can be constructed from a very hard material such as sapphire or ceramic. Further, the nozzles may be individually controllable, at least between on/off or open/closed positions. Such control can be carried out by an electrical signal or wireless signal operable from a nozzle controller 232 which in turn is controlled by computer 220. By controlling the operation of the outlet nozzles 192, the widths and number of cuts made by the manifold 190 can be varied as desired. Controllable nozzles are articles of commerce. Such nozzles include the Omnijet III WaterJet Cutting Head from Jet Edge Inc. of St. Michael, Minn., USA, and the VL1000 and VL2000 Pneumatic Valve from WaterJet Systems International of Joplin, Mo., USA. As an alternative, the water jets from nozzles 192 can be physically blocked as desired using blockers of various configurations. Such blockers are articles of commerce.

As noted above, cutter system 17 includes a cutter apparatus 19 utilizing a single cutter jet or beam that is movable to cut along a single cutting line. The cutter apparatus 19 employs many of the same components as cutter apparatus 18. As such, the components of cutter apparatus 19 that are the same or similar to the corresponding components of cutter apparatus 18 are referred to by the same part number and the same part name.

Figure 8:
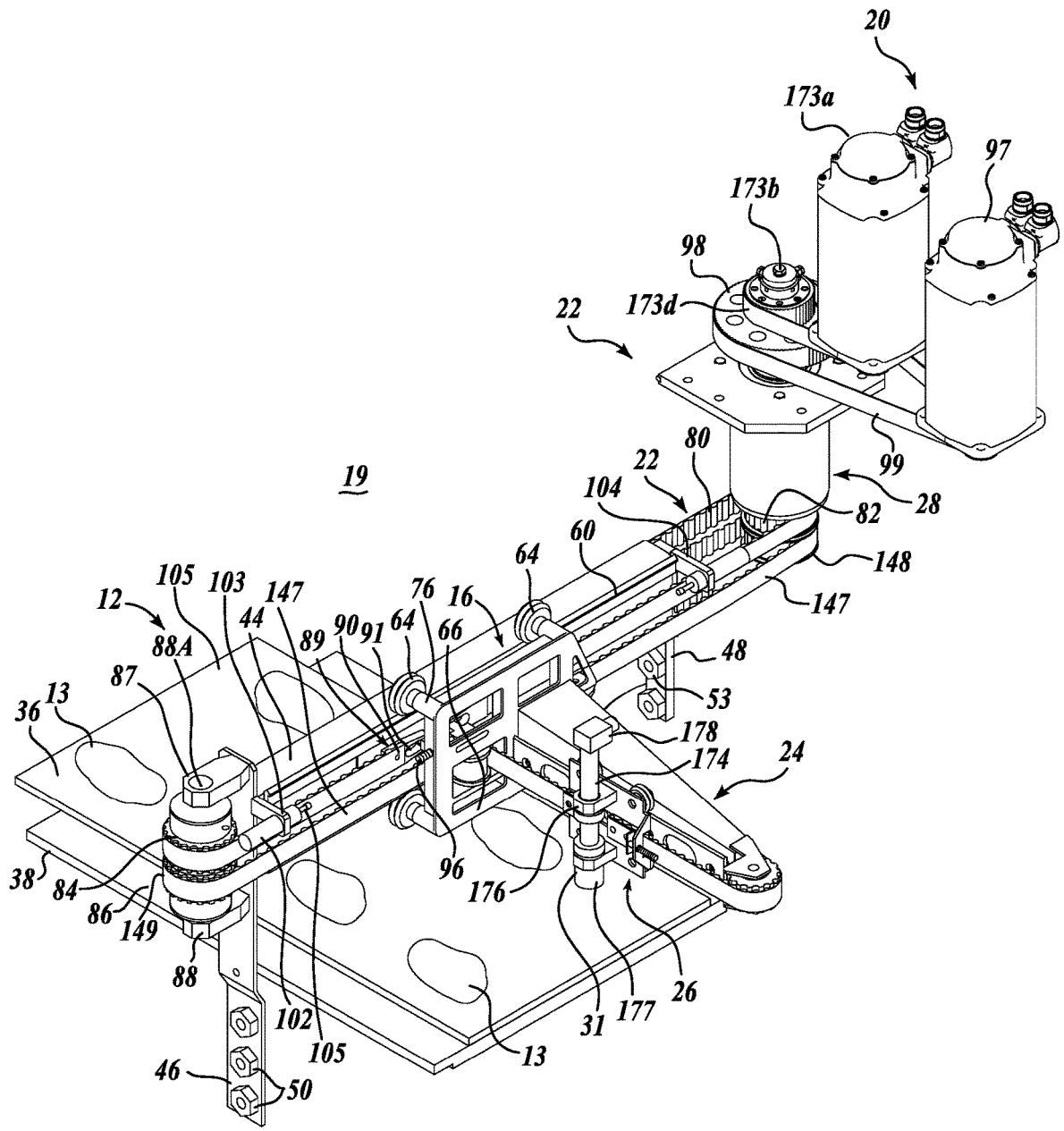
FIG. 8 is an isometric view of a single nozzle-type cutter assembly that may be used in the portioning system of FIG. 9.
Figure 9:
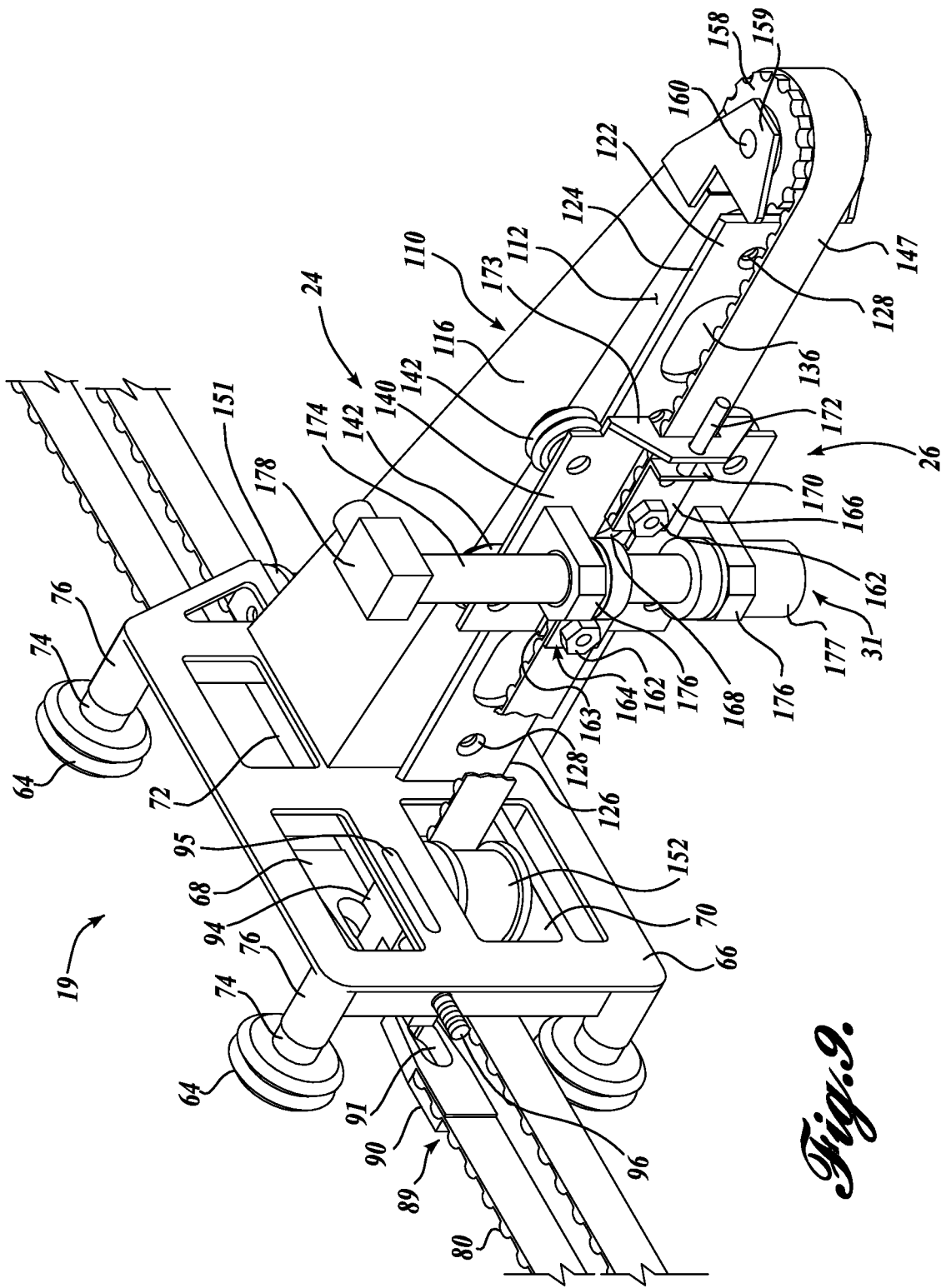
FIG. 9 is an enlarged isometric view of a portion of FIG. 8.

As shown in FIGS. 8 and 9, cutter apparatus 19 in basic form includes a support structure 14 extending across the conveyor 12 for supporting and guiding the carriage 16 for movement transversely to the direction of movement of the conveyor. The carriage 16 is powered by a drive system including, in part, the motive system 20 and the drive train 22. A second, longitudinal support structure or beam 24 is cantilevered outwardly from carriage 16 in a direction generally aligned with the direction of movement of the conveyor 12. A second longitudinal carriage 26 is adapted to move along the beam 24 by a drive system which in part includes the second motive system 28 to power the longitudinal carriage 26 through the drive train 22. A work tool 31, which may be in the form of a high-pressure water jet, is mounted on the carriage 26 to move longitudinally of the conveyor as the work tool is operated on the underlying work product 13 being carried by the conveyor 12.

The remaining description, with respect to cutter apparatus 19, will focus primarily on the differences between cutter apparatus 19 and cutter apparatus 18. The components of cutter apparatus 19 that are the same or similar to cutter apparatus 18 will not be repeated here to avoid redundancy.

Referring to FIGS. 8 and 9 in cutter apparatus 19, an elongated track 122 is mounted on and extends longitudinally on beam sidewall 112. Track 122 includes formed upper and lower edge portions 124 and 126 that are spaced away from sidewall 112 to define upper and lower rails for guiding the longitudinal carriage 26. The track 122 is attached to beam sidewall 112 by a plurality of hardware members 128 and extend through clearance holes formed in the track and through spacers (not shown) fixedly mounted to sidewall 112 at the back side of the track to engage the beam 24. Also to minimize the weight of track 122, cut-out oval openings 136 are formed in the track.

The longitudinal carriage 26 is adapted to travel along track 122. In this regard, the carriage 26 includes a substantially planar, rectangular-shaped bed portion 140 and a pair of upper rollers 142 and a pair of comparable lower rollers (not shown) having concave outer perimeter portions sized to closely engage with the corresponding crowned track 122, having an upper and lower rail edge portions 124 and 126. The upper and lower rollers are mounted on stub shafts extending transversely from the carriage bed 140. Ideally, but not shown, anti-friction bearings are utilized between the stub shafts and the rollers to enhance the free movement of the carriage 26 along track 122.

Carriage 26 is moved back and forth along track 122 by the second motive system 28, constructed similarly to motive system 20, to power the timing belt 147. The drive train for the timing belt 147 has been described above.

An idler pulley 158 is mounted on the free end of gantry 44 by a formed bracket 159 which is fixedly attached to the beam 24. An inlet shaft 160 extends through the center of an antifriction bearing mounted within pulley 158, with the ends of the shaft retained by the upper and lower ears of bracket 159.

The ends of belt 147 are attached to the bed 140 of carriage 26. To this end, one end of belt 147 is clamped to the carriage bed by hardware members 162 that extend through close-fitting clearance holes formed in a clamping plate 163 to clamp the end of the belt to an underlying clamping plate 164 mounted on the outer face of carriage bed 140. The opposite end of belt 147 is clamped to a slide bar 166 which is sized to slide within a horizontal slot 168 formed in the carriage bed 140. A tab 170 extends generally transversely from the end of slide bar 166, and a threaded lock pin 172 in turn extends transversely from the tab to engage within a threaded hole formed in a flange 173 extending transversely from the adjacent end of carriage bed 140. The tension of belt 147 is adjusted by rotation of lock pin 172.

Rotation of driven pulley 148 results in movement of the belt 147 which in turn causes the transverse carriage 26 to move along track 122. In this regard, the motive system 20 includes a servo motor 173a which is drivingly connected with drive pulley 148 by a drive shaft 173b that extends downwardly through a drive shaft assembly. A drive pulley 173c is attached to the upper end of drive shaft 173B, which pulley is connected via timing belt 173d to a drive pulley (not visible) powered by motor 173a. The drive shaft 173b is disposed within the hollow drive shaft extending between pulleys 82 and 98.

As with motor 97, other types of well-known and commercially available rotational actuators may be utilized in place of servo motor 173a. Also, it will be appreciated that motive system 20 is located remotely from not only transverse carriage 16, but also longitudinal carriage 26. As a result, the mass of the motive system 20 is not carried by either of the two carriages; rather, the motive system is positioned at a stationary location, with the drive force being transferred from motive system 20 to carriage 26 by a lightweight timing belt 147. As a consequence, the total mass of the moving portions of apparatus 10 (carriage 16, support beam 24, and carriage 26) is kept to a minimum. This allows extremely high speed movement of the two carriages, with accelerations exceeding eight gravities.

A work tool 31 depicted as in the form of a high pressure liquid nozzle assembly is mounted on the longitudinal carriage 26 to move therewith. The nozzle assembly emits a very focused stream of high pressure water disposed in a vertical cutting line that is transverse to the plane of conveyor belt 36. The nozzle assembly includes a body portion 174 that is secured to the carriage bed 140 by a pair of vertically spaced apart brackets 176. The nozzle assembly includes a lower outlet nozzle 177 directed downwardly toward conveyor belt 36. An entrance elbow 178 is attached to the upper end of nozzle body 174. High pressure liquid nozzles of the type embodied by work tool 31 are well-known articles of commerce.

Figure 10:
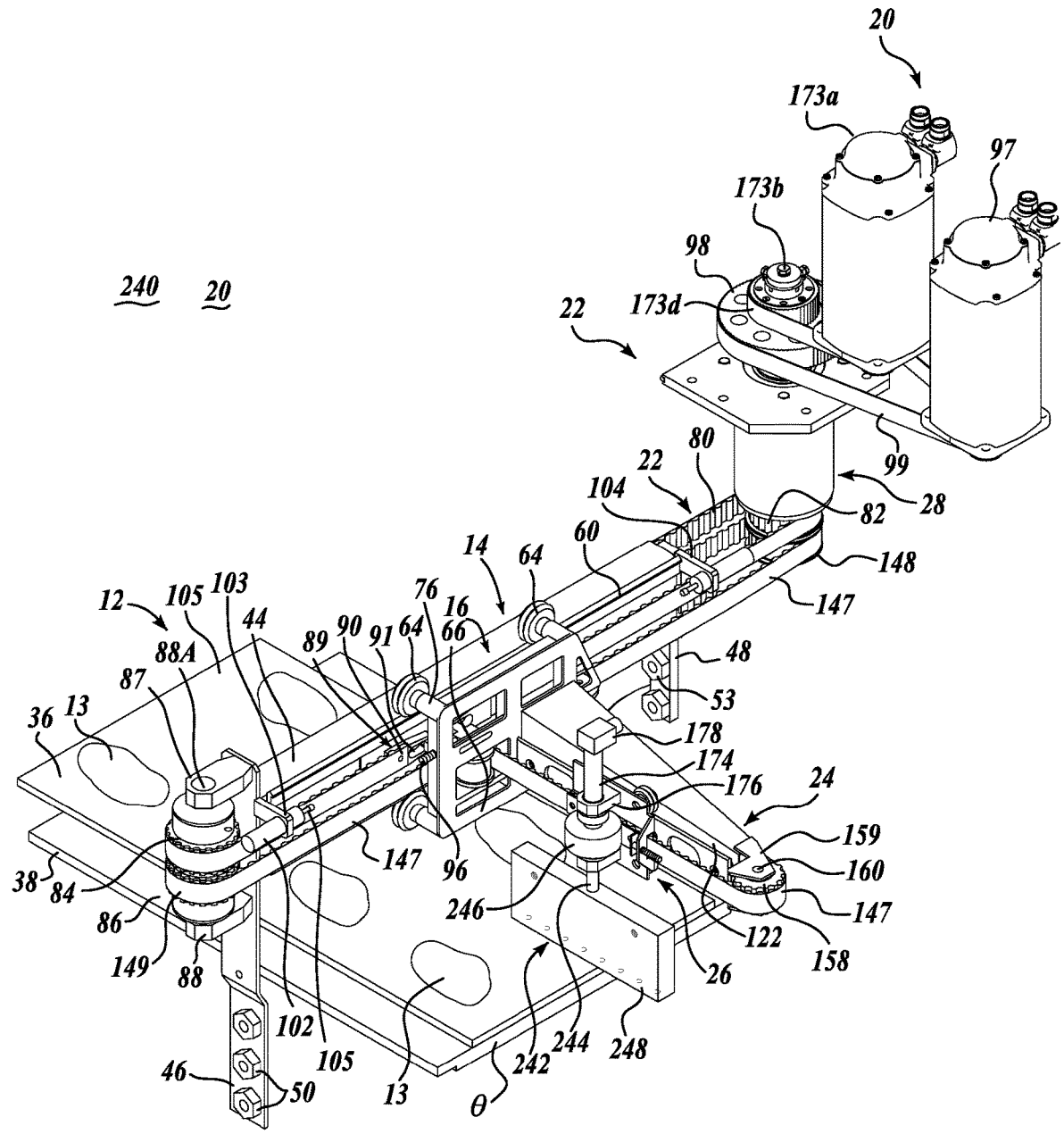
FIG. 10 is an alternative embodiment of the present disclosure, disclosing another system for mounting a manifold cutter.

FIG. 10 illustrates a further embodiment of the present disclosure wherein a cutter assembly 240 consists of a manifold-type cutter 242 mounted on carriage 26 in a manner similar to the manner in which nozzle tool 31 is mounted on the carriage 26. In the cutter system 240, the components thereof that are the same or similar to the components of the cutter assemblies 18 and 19 described above are given the same part number. The structure and function of these components will not be repeated here.

As shown in FIG. 10, the cutter assembly 240 includes an inlet shaft 244 that depends downwardly from a rotary actuator 246 mounted on the carriage 26. The portion cutter assembly 240, located above the rotary actuator, includes a body portion 174 and an entrance elbow 178 for receiving high-pressure fluid in a well-known manner.

A cutter manifold 248 is securely attached to inlet shaft 244, which manifold may be very similar, or the same in construction, as manifold 190 shown in FIGS. 6 and 7. The rotary actuator 246, controllable by computer 220, functions to rotate the inlet shaft 244 and associated cutter manifold 248 as desired so that the manifold 248 can be used essentially in the same manner as manifold 190, with the additional feature that manifold 248 can also move in a direction longitudinally of the conveyor 12 as well as rotate about the longitudinal axis of inlet pipe 204. In a portioning system, for example system 17 shown in FIG. 1, the cutter assembly 240 may replace cutter assembly 18. Alternatively, the cutter assembly 240 may be utilized singularly in place of cutter assemblies 18 and 19.

Cutter system 17 is illustrated as composed of sets of manifold type cutter assembly 18 and single cutter assembly 19. However, the manifold type cutter assembly 18 can be used alone and do not necessarily need to be used in conjunction with one or more of the single cutter assemblies 19. Some of the ways that cutter assembly 18 can be used alone, or in conjunction with one or more single cutter assemblies 19, are described below. This description is not by any means an exhaustive explanation of the various cutting procedures and techniques that are possible using the manifold cutters alone, or the manifold cutters in conjunction with one or more single cutters, but are merely illustrative of a few examples of how such cutters may be employed.

Figure 11:
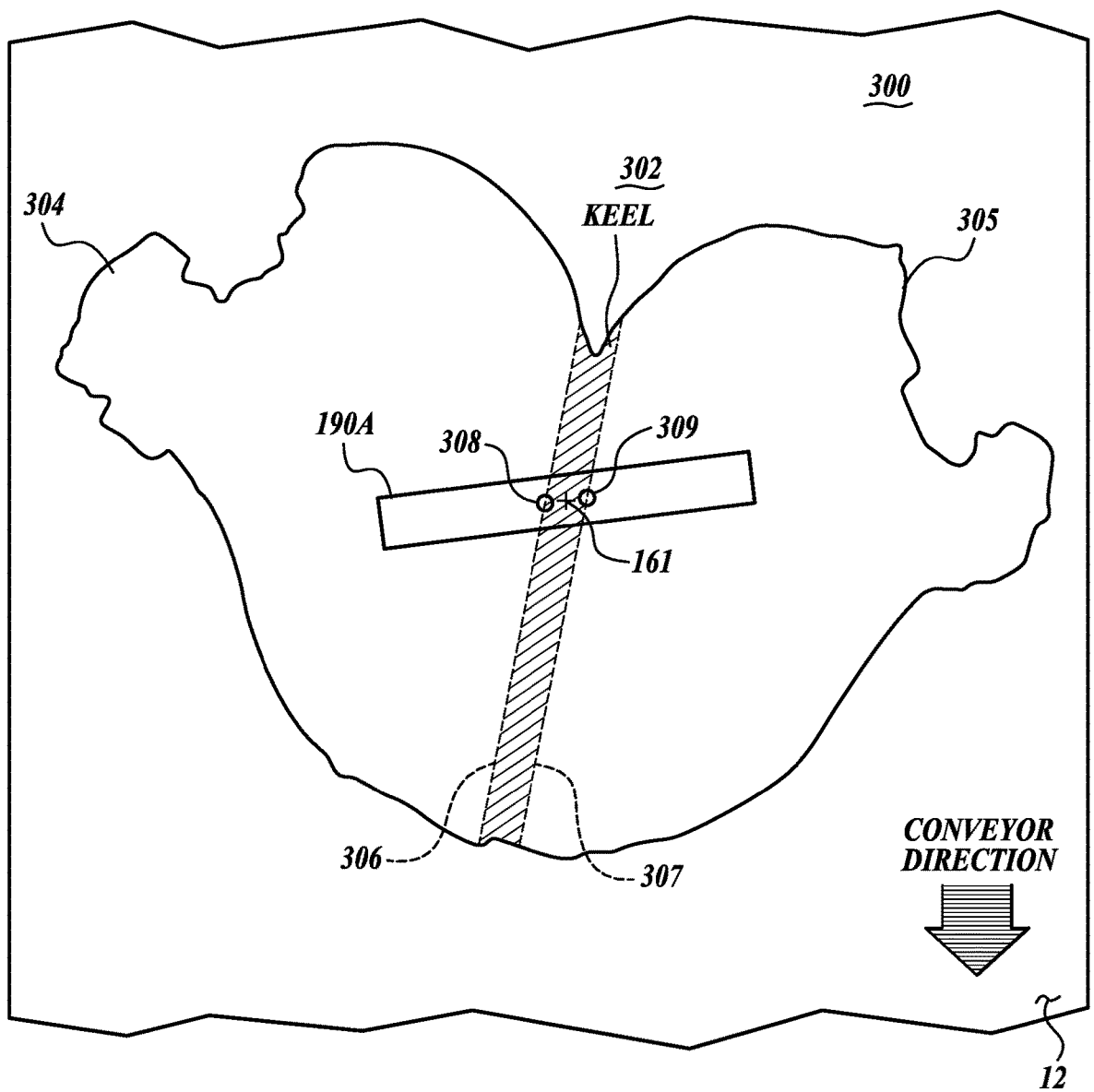
FIG. 11 is a schematic view of how a manifold-type cutter may be utilized to remove the keel of a chicken breast.

Referring initially to FIG. 11, a workpiece 300 in the form of a chicken breast butterfly is illustrated. The manifold cutter 190A can be utilized to separate the two chicken breast into two halves 304 and 305 from a central keel 302. This can be carried out by using two closely-spaced nozzles 308 and 309 of the manifold cutter 190A to span the keel and move the manifold cutter along the length of the keel. Moreover, the cutter 190A can be adjusted to define a cutting width corresponding to the actual width of the keel by rotation of the manifold 190A about the longitudinal axis 161. Moreover, the actual width of the keel 302 can vary along the length of the chicken breast butterfly, and this can be accommodated for by rotating the manifold 190A as needed. Moreover, as shown in FIG. 11, the keel 302 may not be in longitudinal alignment with the conveyor 12, rather, the keel may be angularly disposed with respect to the length of the conveyor. The cutter apparatus 18 can accommodate the angularity of the keel 302 by simultaneous movement of the carriage 16 and rotation of the manifold 190A as the chicken breast butterfly is being transported on the conveyor 12.

Figure 12:
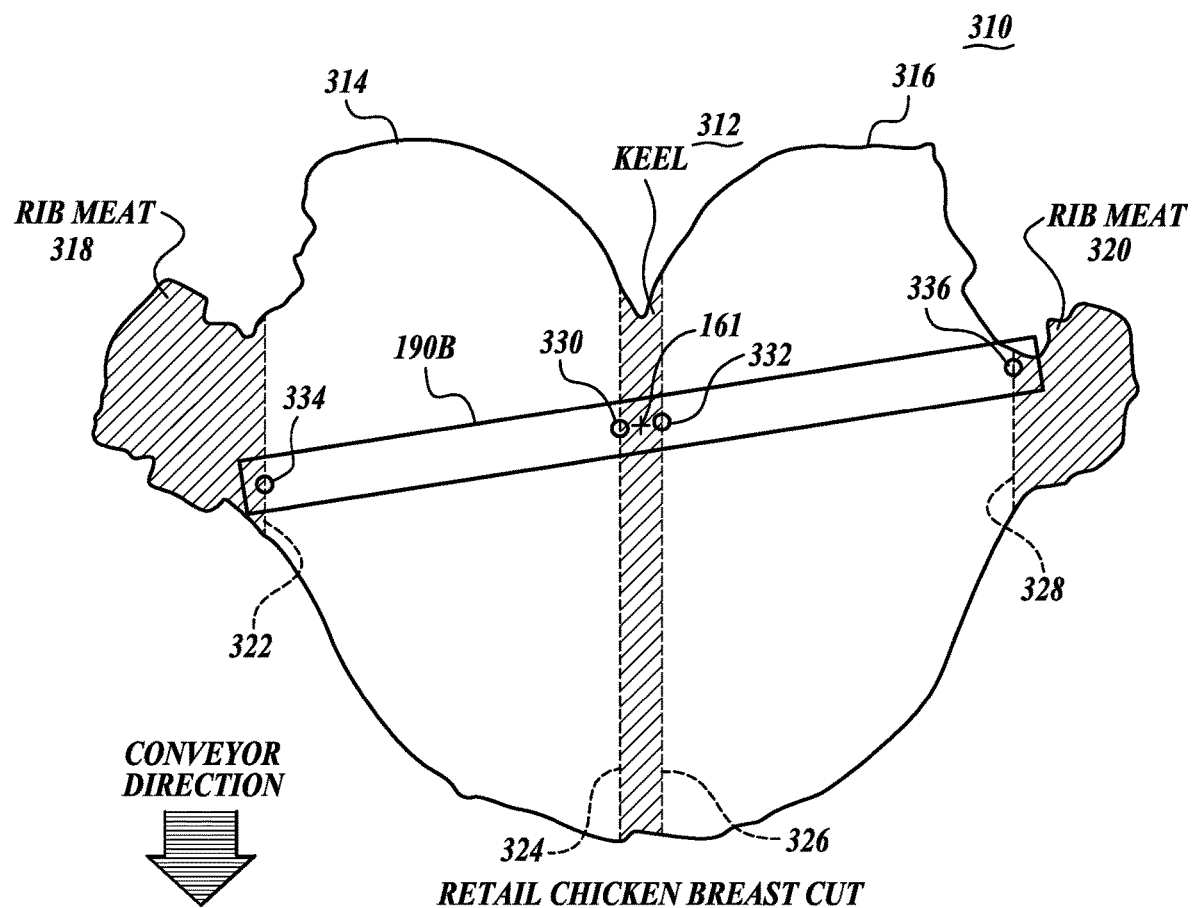
FIG. 12 is a schematic view of how a manifold-type cutter assembly may be utilized to remove the keel and the rib meat sections from a chicken breast.

Another use of manifold type cutters such as cutter apparatus 18 is illustrated in FIG. 12. FIG. 12 illustrates a workpiece 310 composed of a butterfly type chicken breast having the central keel 312 as well as major breast portions 314 and 316, in addition to rib meat portions 318 and 320 projecting from the main breast portions 314 and 316 in a direction away from the central keel 312. The cutter manifold 190B can be utilized to both remove the keel and also the rib meat sections on the sides of the chicken breast butterfly. As a result, the butterfly is separated into two breast portions 314 and 316 as well as the three pieces of trim 312, 318, and 320. The foregoing can be accomplished by utilizing manifold 190B with the nozzles 330, 332, 334 and 336 thereof extending along cut lines 322, 324, 326, and 328 as shown in FIG. 12. Thus, in one pass, the cutter manifold 190B is able to take the place of at least two single cutters such as those depicted by cutter apparatus 19.

Various configurations of the cutter manifold 190B are possible, including positioning the two center nozzles 330 and 332 at a width corresponding to the widest keel that would be encountered. The width of the spacing between nozzles 330 and 332 can be adjusted by rotating the manifold 190B about central axis 161. Also, the locations of the outer nozzles 334 and 336 may be selected based on parameters of the population of the chicken breasts being portioned, such as length, weight, etc. Alternatively, the manifold 190B can be rotated to achieve a "best" or "optimized" cutting width based on the size or other physical parameter of the chicken breast butterfly. It will be appreciated that rotation of the cutter manifold 190B will result in a larger variation of the effective width separating the nozzles 334 from 336 relative to the change in the width between central nozzles 330 and 332. Thus, it is possible by rotating the cutter manifold 190B the removal of the rib meat sections can be fairly optimized.

Further, it is possible to utilize nozzles in conjunction with manifold 190B that are controllable between on and off positions so as to alter the side-to-side locations of cutting lines 322, 324, 326, and 328.

Further, as discussed with respect to FIG. 11, if the chicken breast butterfly 310 is positioned at an angle with respect to the longitudinal direction of conveyor 12, such angulation of the chicken breast can be accommodated by the cross belt movement of the manifold 190B via movement of the carriage 16, together with the simultaneous rotation of the manifold 190B about axis 161.

Figure 13:
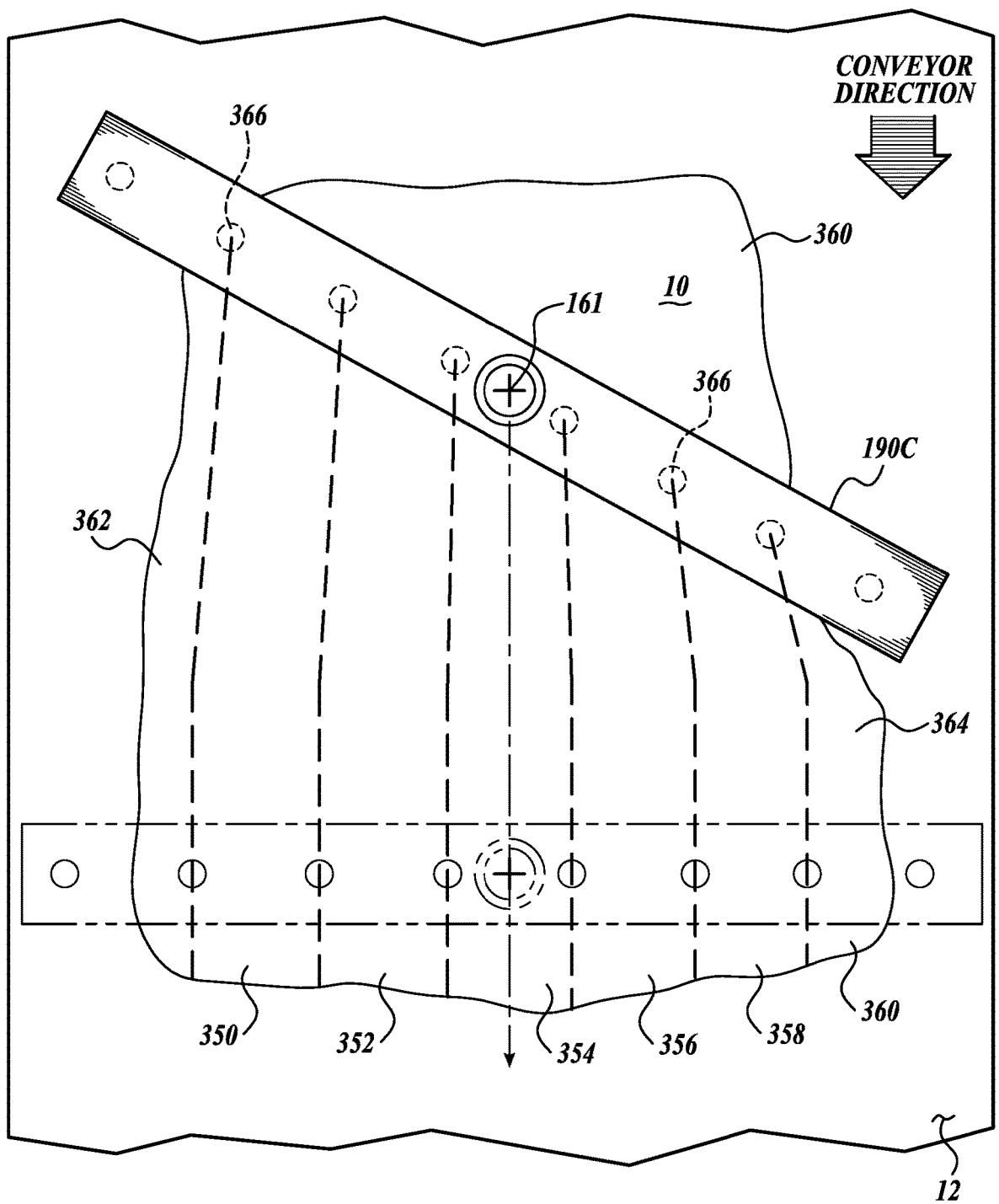
FIG. 13 is a schematic view of how a manifold-type cutter assembly may be utilized to cut strips from a workpiece of variable width.

FIG. 13 illustrates the use of manifold cutter 30 to cut a plurality of strips, such as strips 350, 352, 354, 356, and 358 from a generally rectangular workpiece 360. Because the edges of workpiece 360 do not define the workpiece as a perfect rectangle, it is necessary to adjust/optimize the widths of the strips 350-358 along the length of the workpiece. In this regard, the widths of the strips 350-358 can be narrowed or widened by rotation of the cutter manifold 190C. As shown in FIG. 13, initially the cutter manifold 190C is positioned transversely to the longitudinal center line 359 of the conveyor 12. However, the workpiece is somewhat tapered, and thus narrows along its length. To accommodate the narrowing of the workpiece 360, the cutter manifold 190C is rotated about its rotational axis 161 as shown in FIG. 13. Of course, if the workpiece thereafter widens, the manifold 190C could be rotated to an orientation more transverse to the conveyor and thus take advantage of the widening of the workpiece.

FIG. 13 shows the workpiece 360 being cut with trim sections 362 and 364 on each side of the workpiece. However, it is possible to perhaps maximize the yield by having workpiece trim located on one side only, and thus have one of the nozzles 366 follow closely along an edge of the workpiece, assuming such edge is a good candidate for cutting in this manner. In FIG. 13, the left edge 363 of the workpiece could be a good candidate to serve as an edge of a strip. As such, only trim section 364 would remain.

Also, it is possible to simply cut strips from the workpiece 360 with no trim, and thus the outer strips 362 and 364 may be of somewhat varying widths along their length.

Figure 14:
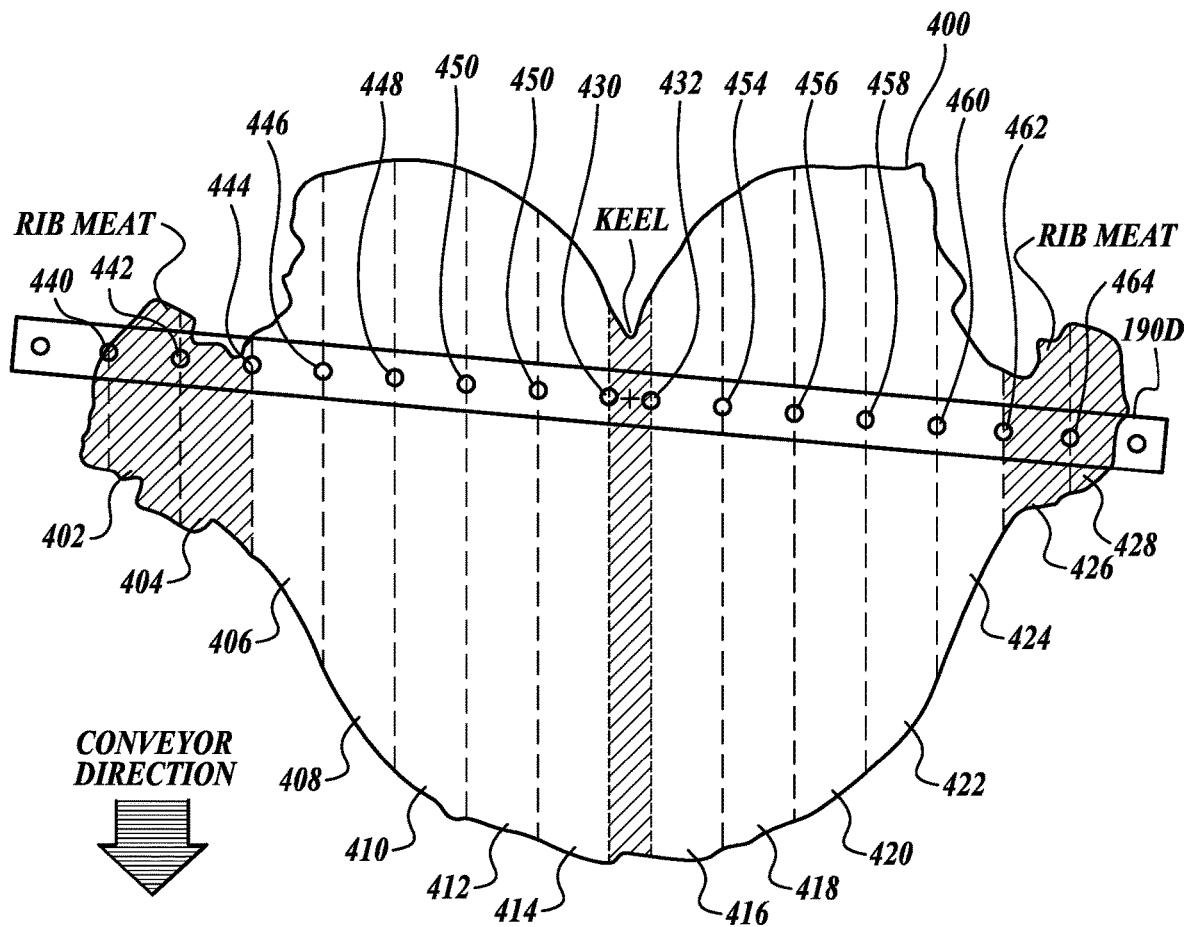
FIG. 14 is a schematic view of how a manifold-type cutter assembly may be utilized to cut strips along the entire width of a chicken breast.

FIG. 14 illustrates the use of a cutter manifold 190D to cut relatively narrow strips from a chicken breast butterfly 400. In FIG. 13, the entire width of the butterfly 400 is portioned into strips 402-428. The center nozzles 430 and 432 can be separated by a distance that would typically accommodate the widest keel to be confronted by the cutter manifold 190D. Also, the remaining nozzles 440-464 of the manifold 190D can be spaced apart at the expected nominal widths of the strips 402-428. As in the other cutting techniques discussed above, the cutter manifold 190D can be rotated to adjust for the overall width of the chicken breast butterfly 400 and also rotated to accommodate the orientation of the chicken breast butterfly 400 on the conveyor 12. As noted above, such orientation can be accommodated by a simultaneous lateral movement of the carriage 16 across the conveyor belt and the rotation of the cutter manifold 190D about its central axis 161.

Figure 15:
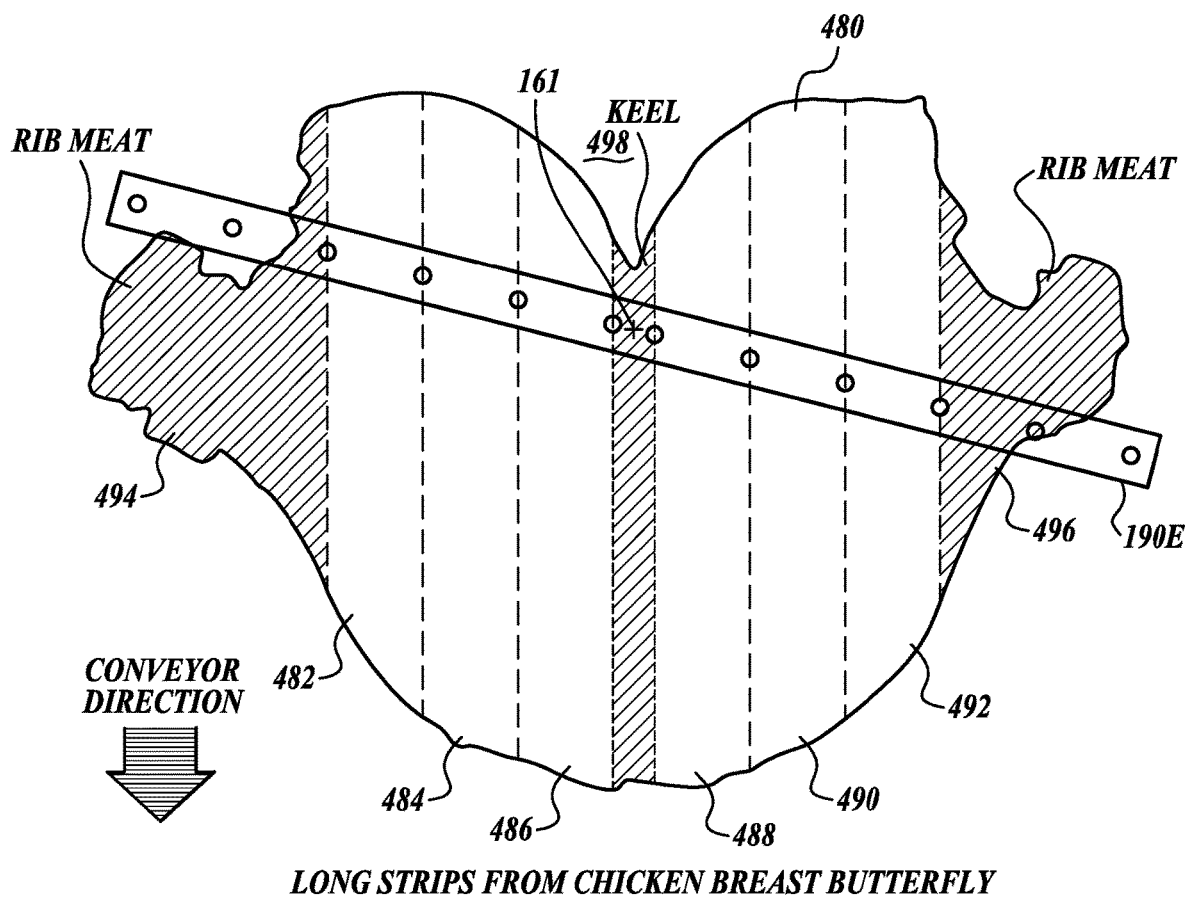
FIG. 15 is a schematic view of how a manifold-type cutter assembly may be utilized to cut strips from the white meat section of a chicken breast.

FIG. 15 illustrates the use of a cutter manifold 190E that is similar in structure and operation to cutter manifold 190D shown in FIG. 14. However, in FIG. 15, the chicken breast butterfly 480 is cut into strips 482-492, but not the rib meat portions 494 and 496. The keel 498 is cut from the butterfly breast 480 in a manner described above. In FIG. 14, the cutter manifold cutter 190E can be sized based on a population of chicken breasts to be portioned. Alternatively, the cutter manifold 190E can be fitted with controllable nozzles and may be turned off and on as required, especially in the outer portions of the cutter manifold. Otherwise, the cutter manifold 190E may be very similar in construction and operation to the cutter manifold 190D described above.

It will be appreciated that, as shown in FIG. 15, the cutter manifold 190E can be rotated so as to change the overall width of the cutter manifold 190E to span the entire width of the chicken breast butterfly, thereby to optimize/maximize the harvest of the chicken breast as well as the number of strips that can be cut from the chicken breast. In this regard, the cutter manifold 190E can be rotated so that the nozzles can be aligned closely to the side edges of the chicken breast (at the intersection of the chicken breast white meat with the rib meat).

Moreover, the foregoing optimum cutting of the chicken breast can occur even if the chicken breast is not aligned with the length of the conveyor, but askew to the conveyor. As noted above, in that situation, the misalignment of the chicken breast on the conveyor can be accommodated by the simultaneous lateral movement of the carriage 16 across the conveyor and the rotation of the cutter manifold 190E about its central axis 161.

Figure 16:
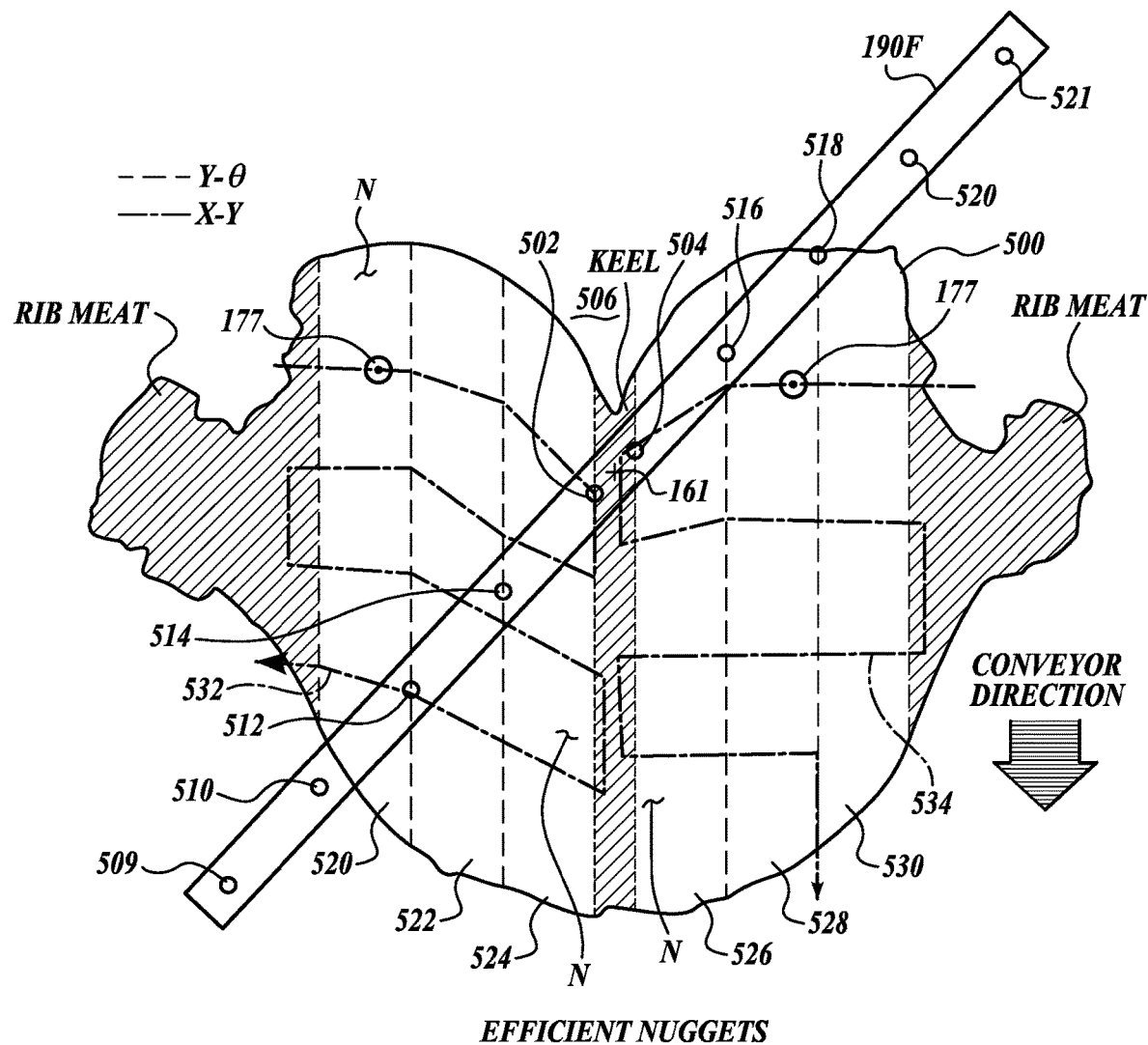
FIG. 16 is a schematic view of how a manifold-type cutter assembly may be utilized in conjunction with single stream water jet cutters for efficiently cutting nuggets from a chicken breast.

FIG. 16 illustrates the use of a manifold cutter 190F in conjunction with two single cutter nozzles 177 to efficiently portion the chicken breast butterfly 500 into nuggets N. In this regard, the cutter manifold 190F may be similar in construction and operation to cutter manifold 190E shown in FIG. 15, wherein nozzles 502 and 504 are used to remove the keel 506 from the breast butterfly 500. Further nozzles 510-518 cut the butterfly breast into strips 520-530. Thereafter, single cutter nozzles 177, located downstream from cutter manifold 190F, follow generally transverse back-and-forth cut paths 532 and 534, thereby to cut the strips into a plurality of nuggets. As described above, in further embodiments of the present disclosure, the cutter manifold 190F can be rotated to accommodate the size (width) of the breast butterfly, as well as the width of the keel 506.

It will be appreciated that by use of the scanning data with respect to the butterfly breast 500, the cut path of cutter manifold 190F and the cut paths 532 and 534 of cutter nozzles 177 may be selected to achieve shape and weight parameters for the nuggets. Also, an optimization algorithm can be used to optimize the nugget N weights, aspect ratios, and shapes, with the additional restraint of achieving continuity in the cross-cuts being made by the nozzles 177. In this regard, as shown in FIG. 16, the cut paths 532 and 534 are not simply transverse to the length of the keel 506, but extend diagonally across the strips 520-530, thereby to achieve nuggets N of optimum physical parameters. Moreover, these results can be achieved by a minimum number of cutter apparatuses.

It will be further appreciated that the cutter manifold 190F can be rotated to accommodate the different widths of the chicken breast butterfly 500. In addition, the manifold cutter 190F can be oriented to accommodate different numbers of strips to be cut from the chicken breast butterfly, thereby to achieve nuggets N of a desired size, weight, shape, etc. In this regard, the number of strips, such as strips 520-530, to be cut from the chicken breast butterfly can be selected. FIG. 16 shows six strips 520-530 being cut. However, the manifold cutter 190F can be rotated to an orientation to cut eight strips, especially if the chicken breast is especially thick, in order to better achieve the desired nugget weight while maintaining, in plan view, a shape or aspect ratio that is desired, such as approximately square. If, on the other hand, the chicken breast meat is especially thin, it may be desirable to cut the chicken breast into a fewer number of strips (such as four or five) in order to achieve the desired nugget weight. Thus, the cutting system shown in FIG. 16 is capable of accommodating significant differences in the size and thickness of the chicken breasts while producing nuggets that meet desired physical parameters.

As with the other methods of utilizing cutter assemblies 18 and 19, described above, the movement of the cutter manifold 190F and the single cutters 177 can be adjusted if the butterfly breast is not positioned in alignment with the length of the conveyor 12. As described above, the movement of the manifold 190F can be adjusted by movement of carriage 16, as well as the rotation of cutter manifold 190F about axis 161. Correspondingly, the movement of cutter nozzles 177 can be adjusted to accommodate the angulation of the butterfly breast 50 on the conveyor belt by movement of the corresponding transverse carriage 16 and the longitudinal carriage 26 associated with the cutter nozzles 177.

Although cutting of the nuggets °N may be advantageously produced from the butterfly chicken breast 500 in a manner described above, it will be appreciated that it is also possible to produce the nuggets with a cutter manifold that may not be rotatable in the manner of manifold 190F. Such fixed orientation manifold would not necessarily be able to adjust for the overall width of the chicken breast nor for the misalignment of the chicken breast on the conveyor belt. Nonetheless, nuggets N could be produced in a very efficient manner via the use of a single manifold-type cutter and two single beam/line cutters such as cutters 177. The use of a fixed manifold would still provide the ability to cut strips from a chicken breast while knowing how the breast meat is distributed about the chicken breast (from the prior scanning) and then make connected cross cuts of the strips that optimize for minimization of weight distribution and/or desired shape, while still maintaining the constraint of a connected cut.

Other than the manifold being in a fixed position, manifolds could be utilized that may be manually rotatable and then locked in position in a new orientation, thereby to better accommodate variations in chicken breasts or other work products from batch to batch. For example, a new batch of chicken breasts from a particular source may be of a larger size than the batch just processed. Consequently, the manifold cutter may be rotated to an optimal orientation to accommodate such a larger size chicken breast. Of course, the reverse is also true, whereby the cutter manifold may be rotated to a position to accommodate chicken breasts that may be smaller in size than the chicken breasts that were last processed.

Figure 17:
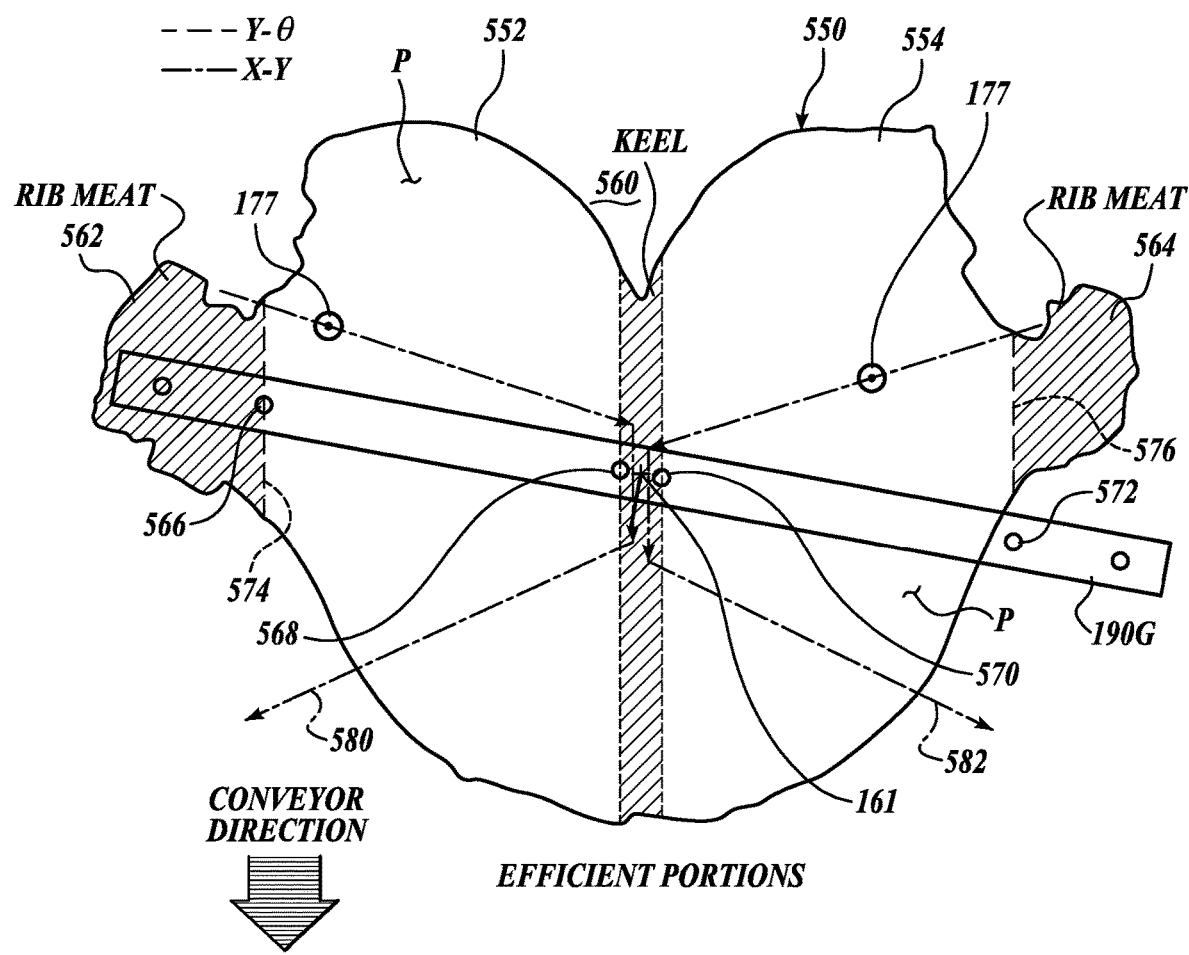
FIG. 17 is a schematic view of how a manifold-type cutter assembly, together with single jet nozzles, may be utilized to effectively and efficiently portion chicken breasts into relatively large portions.

FIG. 17 illustrates the use of cutter assemblies 18 and 19 to portion a chicken breast butterfly 550 into relatively large portions. In FIG. 17, each chicken breast half 552 and 554 has been divided into three relatively large portions. This is accomplished by the use of cutter manifold 190G, which is similar to cutter manifold 190B shown in FIG. 12, wherein the cutter manifold is used to remove the keel 560 and the rib meat sections 562 and 564 from the workpiece (chicken breast butterfly 550). In this regard, the cutter manifold 190G utilizes four cutter nozzles 566, 568, 570, and 572. As described above with respect to FIG. 12, the cutter manifold 190G can be rotated about central axis 161 so as to change the width separating the cut lines 574 and 576, which cut the rib meat section 562 and 564 from the workpiece (chicken breast butterfly 550).

After the longitudinal cuts made by the cutter manifold 190G, single nozzles 177 travel along generally across cut portions 552 and 554 in back-and-forth cut paths 580 and 582, thereby to portion the breast portions into relatively large, individual portions. As described relative to the nozzles 177 utilized in FIG. 16, the movement of the nozzles 177 in FIG. 17 can be adjusted to accommodate the situation if the position of workpiece (chicken breast butterfly 550) is skewed on the conveyor belt. The same is true with the ability of the cutter manifold 190G to accommodate misalignment of the workpiece (chicken breast butterfly 550) on the conveyor belt.

FIG. 18 illustrates one manner in which a manifold cutter assembly, such as manifold cutter assembly 18, could be utilized to dice a workpiece 590 into individual nuggets 592. In this regard, approximately rectangularly-shaped workpieces 590 are noted at approximately 45° to a direction of travel of conveyor belt 12. This direction of travel is represented by arrows 594. Scanning of the workpiece 590, as described above, is carried out to determine physical characteristics of the workpiece, including its thickness and average thickness, overall dimensions, as well as its orientation on the conveyor belt 12. This information is also utilized to orient the cutter manifolds 190H and 190I relative to the workpiece. In this regard, the first manifold 190H is activated to pass over the workpiece 590 to cross the conveyor 12 at a selected speed near the belt speed, thereby cutting the workpiece into strips that are approximately 45° relative to the length of the conveyor belt. The angular orientation of the cutter manifold 190 can be adjusted to accommodate the overall size (width) of the workpiece 590. After the cutter manifold 190H has passed across the conveyor 12, a second cutter manifold 190I passes over the same workpiece in the opposite direction, making second cuts, which turn the strips created by cutter manifold 190H into nuggets 592. Again, the angular orientation of the cutter manifold 190I can be adjusted to achieve optimum cutter spacing on the workpiece, thereby to minimize trim while achieving optimum weight targets for the nuggets 592.

It will be appreciated that cutter manifold 190H, which, after passing across the conveyor belt 12, is located on the opposite side of the conveyor belt as shown in FIG. 18. Thus, for the next workpiece 590 to be cut, the manifold 190H can pass across the conveyor belt in the opposite direction to make the first cut pattern on the next workpiece, thereby dividing the workpiece into strips. Thereafter, the second manifold 190I, which is now on the opposite side of the conveyor belt 12 shown in FIG. 18, can re-cross the conveyor belt 12 in the opposite direction from its last direction of travel, thereby cross-cutting the strips created by cutter 190H to produce nuggets 592. As can be appreciated, the nuggets 592 can be cut by a very efficient movement of the cutter manifolds 190H and 190I.

Although not specifically illustrated, it will be appreciated that manifold cutter assemblies, such as manifold cutter assemblies 18, can be utilized so that two cutter jets or beams are steered through the same path, thereby doubling the effectiveness of the cutting. This can be of assistance in portioning particular types of meat which are difficult to cut, or for cutting through fish bones and other hard-to-cut work products.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A method of cutting a workpiece, comprising:
    moving a workpiece along a travel path;
    supporting a first array cutter above the workpiece to emit an array of cutter beams downwardly toward the workpiece to cut the workpiece along cutting paths defined by the cutter beams;
    the first array cutter pivotable about an upright rotational axis;
    moving the upright rotational axis in a controlled manner transversely across the width of the travel path of the workpiece to position the array of cutter beams in unison to coincide with the lateral location of the workpiece relative to the travel path and to accommodate the angular orientation of the workpiece relative to the travel; and
    emitting the array of cutter beams while moving the upright axis transversely and simultaneously rotating the first array cutter about the upright rotational axis, the upright rotational axis extending in the direction that cutter beams are emitted from the array cutter; and
    wherein the rotation of the first array cutter being independent of the transverse movement of the first array cutter, to alter the overall width of the array defined by the cutter beams, to correspond to changes in the overall width of the workpiece being cut.

2. The method of claim 1, further comprising controlling the movement of the first array cutter to cut the workpiece into one or more desired widths.

3. The method of claim 1:
    wherein emitting an array of cutter beams from the first array cutter comprises first and second cutter beams; and
    controlling the movement of the first array cutter by controlling the effective width of the cutting path created by the first and second cutter beams by rotation of the first array cutter about the rotational axis.

4. The method of claim 1, further comprising also simultaneously moving the first array cutter longitudinally along the travel path of the workpiece without changing the overall width of the array of cutter beams.

5. The method of claim 1, wherein the first array cutter comprises a manifold having an array of outlets for emitting a plurality of cutter beams.

6. The method of claim 1, wherein the first array cutter comprises a cutter manifold for emitting an array of cutter beams, the cutter manifold carried by a first carriage disposed for travel in a direction laterally to the travel path of the workpiece, while maintaining the rotational orientation of the cutter manifold about the upright rotational axis.

7. The method of claim 1, further comprising using a drive system for simultaneously translating the first array cutter laterally and independently rotating the first array cutter.

8. The method of claim 7, wherein:
    moving the workpiece along the travel path on a conveyor; and
    simultaneously translating the first array cutter laterally and rotating the first array cutter over the conveyor with the transverse movement of the first array cutter being independent of the rotational movement of the first array cutter.

9. The method of claim 8, further comprising controlling the cutting path of the cutter beams to maintain the cutting path along a reference path with respect to the workpiece.

10. The method of claim 9, wherein:
    the workpiece having a length and a width, with the length of the workpiece not in alignment with the direction of travel of the conveyor; and
    the cutting path of the cutter beam is maintained along the desired reference path extending along the length of the workpiece.

11. The method of claim 1, further comprising moving a second array cutter emitting a cutter beam in translational movement in coordination with the first array cutter for cutting the workpiece into desired portions.

12. The method of claim 1, further comprising operating the first array cutter to selectively terminate and/or initiate the flow of one or more cutter beams as the first array cutter moves relative to the workpiece.

13. The method of claim 1, wherein two cutter beams extend along the same cutting path.

14. The method of claim 1, wherein the first array cutter comprises an elongate manifold having a plurality of cutter beam outlets spaced along the length of the manifold, and the upright rotational axis disposed transversely to the length of the manifold.

15. A method of cutting a workpiece, comprising:
    moving a workpiece along a travel path;
    supporting a first array cutter above the workpiece to emit an array of cutter beams toward the workpiece;
    moving the first array cutter in a controlled manner transversely across the width of the travel path of the workpiece to position the first array cutter to coincide with the lateral location of the workpiece relative to the travel path and to accommodate the angular orientation of the workpiece relative to the travel path;
    simultaneously rotating the first array cutter about a rotational axis extending in the direction of cutter beams independently of the transverse movement of the first array cutter, to alter the overall width of the array defined by the cutter beams of the first array cutter, to correspond to changes in the overall width of the workpiece being cut; and
    further comprising moving a second array cutter across the one or more strips of the workpiece resulting from the cutting of the workpiece by the first array cutter.

16. A method of cutting a food piece into a plurality of longitudinal strips, the width of the food piece varying along the length of the food piece, comprising:
    providing an array cutter pivotable about an upright axis located centrally along the width of a cutting pattern; and
    moving the upright axis longitudinally along the food piece, and transversely across the food piece independently of the longitudinal movement of the upright axis while emitting a plurality of cutter beams from the array cutter towards the food piece, the cutter beams defining the cutting pattern extending across the width of the food piece with the outermost cutter beams of the cutting pattern disposed closest to the margins of the food piece to cut the food piece along cutting paths defined by the cutter beams; and
    simultaneously and independently of the longitudinal and transverse movement of the array cutter, rotating the array cutter about the upright axis, said rotation of the cutting pattern in response to change in the width of the food piece, whereby the overall width of the cutting pattern formed by the cutter beams is adjusted to correspond to changes in the width of the food piece as the food piece is being cut by the array cutter.

17. The method according to claim 16, wherein:
the cutter beams from the array cutter define outermost cutter beams of the cutting pattern; and
the array cutter is rotated so that at least one of the outermost cutter beams remains within a side margin of the food piece during cutting of the food piece by the array cutter.

18. The method according to claim 17, wherein the outermost cutter beams of the array cutter remain within the side margins of the food piece during cutting of the food piece by the array cutter.

19. The method according to claim 16, wherein:
the cutter beams of the array cutter define outermost cutter beams of the cutting pattern; and
the array cutter is rotated about the upright axis and/or moved transversely to the food piece so that one of the outermost cutter beams follows a side margin of the food piece during cutting of the food piece by the array cutter.

20. The method according to claim 16, further comprising selectively disabling and/or enabling one or more of the cutter beams during the cutting of the food piece so as to change the cutting pattern defined by the cutter beams emitted by the array cutter.

21. The method of claim 16, wherein two cutter beams extend along the same cutting path.

22. The method of claim 16, wherein the array cutter comprises an elongate manifold having a plurality of cutter beam outlets spaced along the length of the manifold, and the upright axis disposed transversely to the length of the manifold.

* * * * *

UNITED STATES PATENT AND TRADEMARK OFFICE
CERTIFICATE OF CORRECTION

PATENT NO. : 10,611,046 B2  
APPLICATION NO. : 15/487338  
DATED : April 7, 2020  
INVENTOR(S) : G. Blaine Page 1 of 1

It is certified that error appears in the above-identified patent and that said Letters Patent is hereby corrected as shown below:

On the Title Page

Page 2 item (60) Column 1, Line 1 "61/868,485" should read -- 61/868,465 --

Signed and Sealed this  
First Day of June, 2021

Drew Hirshfeld  
*Performing the Functions and Duties of the*  
*Under Secretary of Commerce for Intellectual Property and*  
*Director of the United States Patent and Trademark Office*